US011828364B2

United States Patent
Whiteley et al.

(10) Patent No.: US 11,828,364 B2
(45) Date of Patent: Nov. 28, 2023

(54) SEAL AND PLUMBING FITTING

(71) Applicant: AALBERTS INTEGRATED PIPING SYSTEMS LIMITED, Doncaster (GB)

(72) Inventors: Paul Nicholas Whiteley, Doncaster (GB); Samuel Charles White, Doncaster (GB)

(73) Assignee: AALBERTS INTEGRATED PIPING SYSTEMS LIMITED, Doncaster (GB)

( * ) Notice: Subject to any disclaimer, the term of this patent is extended or adjusted under 35 U.S.C. 154(b) by 492 days.

(21) Appl. No.: 17/013,704

(22) Filed: Sep. 7, 2020

(65) Prior Publication Data

US 2021/0071762 A1  Mar. 11, 2021

(30) Foreign Application Priority Data

Sep. 5, 2019 (GB) ..................................... 1912765

(51) Int. Cl.
  *E03B 7/07* (2006.01)
  *F16J 15/02* (2006.01)
  *E03C 1/02* (2006.01)
  *E03C 1/01* (2006.01)

(52) U.S. Cl.
  CPC ............. *F16J 15/022* (2013.01); *E03C 1/021* (2013.01); *E03C 1/01* (2013.01)

(58) Field of Classification Search
  CPC . E03B 7/072; E03C 1/02; E03C 1/021; E03C 1/01; F16J 15/022; F16J 15/32; F16J 15/3232; F16K 5/04; F16K 5/0478; F16K 5/08; F16K 11/08; F16K 11/0856
  See application file for complete search history.

(56) References Cited

U.S. PATENT DOCUMENTS

| | | | |
|---|---|---|---|
| 3,683,966 A | 8/1972 | Payne | |
| 3,891,001 A | 6/1975 | Botnick | |
| 4,169,491 A | 10/1979 | Bajka | |
| 4,253,481 A | 3/1981 | Sarlis, Jr. | |
| 5,226,454 A * | 7/1993 | Cabalfin | F16K 31/045 251/129.01 |
| 5,947,483 A | 9/1999 | Brummer et al. | |
| 6,123,094 A | 9/2000 | Breda | |
| 7,849,877 B2 * | 12/2010 | Tan | F16K 11/076 251/285 |

(Continued)

FOREIGN PATENT DOCUMENTS

| | | |
|---|---|---|
| CN | 204267736 U | 4/2015 |
| DE | 3526581 A | 2/1987 |

(Continued)

OTHER PUBLICATIONS

United Kingdom Search Report for corresponding UK application No. GB1912765.3, dated Jan. 11, 2022.

(Continued)

*Primary Examiner* — John Kwon
*Assistant Examiner* — Johnny H Hoang
(74) *Attorney, Agent, or Firm* — Notaro, Michalos & Zaccaria P.C.

(57) ABSTRACT

A seal for a plumbing fitting includes two or more respective apertured sealing portions. Each apertured sealing portion independently includes one or more edge portions enclosing an aperture therebetween. The apertured portions are integrally formed.

16 Claims, 14 Drawing Sheets

(56) References Cited

U.S. PATENT DOCUMENTS

| | | | | |
|---|---|---|---|---|
| 8,082,951 | B2* | 12/2011 | Arsin | F16K 27/065 251/118 |
| 2009/0020470 | A1* | 1/2009 | Bassett | B01D 27/106 210/235 |
| 2015/0188157 | A1 | 7/2015 | Na et al. | |
| 2016/0369908 | A1* | 12/2016 | Kurincak | F16K 5/06 |
| 2019/0160910 | A1 | 5/2019 | Mano | |
| 2021/0071762 | A1 | 3/2021 | Whiteley et al. | |

FOREIGN PATENT DOCUMENTS

| | | |
|---|---|---|
| EP | 3789641 A1 | 3/2021 |
| FR | 1452637 A | 4/1966 |
| FR | 2827361 A1 | 1/2003 |
| GB | 744034 A | 1/1956 |
| GB | 1472993 A | 5/1977 |
| GB | 2279431 A | 1/1995 |
| IN | 201641029015 A | 8/2016 |
| JP | 2000054352 A | 2/2000 |
| WO | 2015/173811 A1 | 11/2015 |

OTHER PUBLICATIONS

United Kingdom Examination Report for corresponding UK application No. GB1912765.3, dated Jan. 12, 2022.
European Examination Report for corresponding European application No. EP20194924.5, dated Jan. 13, 2022.
European search report for corresponding European patent application No. EP 20194924, completed Dec. 23, 2020.
Lezyne LED Femto Drive Bike Light, website ad downloaded Feb. 26, 2020, https://www.cyclerepublic.com/lezyne-led-femto-drive-bike-light-black-pair.html.

* cited by examiner

SEAL AND PLUMBING FITTING

TECHNICAL FIELD OF THE INVENTION

The present invention relates to a seal, a plumbing fitting comprising a seal, and methods and uses relating thereto.

BACKGROUND TO THE INVENTION

It is known to use seals in plumbing fittings, e.g. valves such as pressure independent control valves (PICVs), to prevent inadvertent fluid egress between parts of the plumbing fitting. Such seals are often provided in the form of an O-ring, or an arrangement of respective O-rings.

For example, a known PICV comprises an arrangement of respective O-ring seals. The PICV has a housing in which a cartridge is received, the housing and the cartridge each having an inlet and an outlet. The O-ring seals are independently arranged around an outer surface of the cartridge so as to encircle the cartridge. This arrangement of O-ring seals is, in general terms, intended to prevent inadvertent fluid egress between the housing and the pod.

A problem with known seals is that they can impart a substantial amount of frictional resistance to parts of a plumbing fitting which are movable relative to each other and between which the seal is located. Consequently, it can be difficult to move said parts as required.

Another problem with known seals is that they can be easily damaged by moving parts of a plumbing fitting relative to each other. In particular, such relative movement can crack or deteriorate the seal, which can impair the performance of the plumbing fitting.

Yet another problem with known seals is that they can be difficult to assemble, which can result in protracted assembly times, incorrect assembly and impaired performance.

It is an object of the present invention to obviate or overcome one or more of the abovementioned or other problems.

SUMMARY OF THE INVENTION

According to a first aspect of the present invention, there is provided a seal for a plumbing fitting, the seal comprising: two or more respective apertured sealing portions, each apertured sealing portion independently comprising one or more edge portions enclosing an aperture, which apertured sealing portions are integrally formed.

In embodiments, when arranged in a plumbing fitting, the seal imparts reduced frictional resistance between moving parts of the plumbing fitting relative to seals of the prior art. In embodiments, the seal is easier to assemble in a plumbing fitting relative to seals of the prior art. In embodiments, in use in a plumbing fitting, the seal is less likely to become damaged relative to seals of the prior art.

Herein, by 'which apertured sealing portions are integrally formed' it is meant that the apertured sealing portions are together made of a single piece, or are together formed into a single piece.

Each apertured sealing portion and its aperture may be of any particular shape, as required for a given application. In light of the details of the present specification, a person skilled in the art will be able to select and provide suitable dimensions of each apertured sealing portion and its aperture, as required for a given application.

The seal may comprise a first apertured sealing portion, a second apertured sealing portion and a third apertured sealing portion, each apertured sealing portion independently comprising one or more edge portions enclosing an aperture, wherein the second apertured sealing portion is arranged between the first apertured sealing portion and the third apertured sealing portion, which apertured sealing portions are integrally formed.

One, more or each edge portion of one, more or each apertured sealing portion may be independently substantially linear.

One, more or each edge portion of one, more or each apertured sealing portion may be independently substantially curved.

One, more or each apertured sealing portion may be independently substantially annular (i.e. ring-shaped).

One, more or each apertured sealing portion may be independently substantially polygonal. One, more or each apertured sealing portion may be independently substantially quadrilateral. The quadrilateral may have four edge portions. The quadrilateral may be substantially rectangular. The rectangle may have two long edge portions and two short edge portions.

The first apertured sealing portion may be substantially annular (e.g. ring-shaped).

The third apertured sealing portion may be substantially annular (e.g. ring-shaped).

The second apertured sealing portion may be substantially quadrilateral. The quadrilateral may have four edge portions. The quadrilateral may be substantially rectangular. The rectangle may have two long edge portions and two short edge portions.

Two of the edge portions of the substantially quadrilateral second apertured sealing portion may be substantially linear. Two of the other edge portions of the substantially quadrilateral second apertured sealing portion may be substantially curved. Two of the opposing edge portions of the substantially quadrilateral second apertured sealing portion may be substantially linear. Two of the other opposing edge portions of the substantially quadrilateral second apertured sealing portion may be substantially curved. Two of the long edge portions of the substantially rectangular second apertured sealing portion may be substantially linear. Two of the short edge portions of the substantially rectangular second apertured sealing portion may be substantially curved. Where the second apertured sealing portion is substantially quadrilateral or substantially rectangular, each of the substantially curved edge portions of the second apertured sealing portion may be convex when viewed from between those substantially curved edge portions.

Each of the edge portions of the substantially quadrilateral second apertured sealing portion may be substantially curved. Two of the substantially curved edge portions of the substantially quadrilateral second apertured sealing portion may be convex when viewed from between those substantially curved edge portions. Two of the other substantially curved edge portions of the substantially quadrilateral second apertured sealing portion may be concave when viewed from between those substantially curved edge portions. Two of the long edge portions of the substantially rectangular second apertured sealing portion may be concave when viewed from between those substantially curved edge portions. Two of the short edge portions of the substantially rectangular second apertured sealing portion may be convex when viewed from between those substantially curved edge portions.

Part of an apertured sealing portion may form part of another apertured sealing portion. Part of an edge portion of an apertured sealing portion may form part of an edge portion of another apertured sealing portion.

Part of the first apertured sealing portion may form part of the second apertured sealing portion. Part of an edge portion of the first apertured sealing portion may form part of an edge portion of the second apertured sealing portion. Part of an edge portion of the first apertured sealing portion may form part of a substantially curved edge portion of the second apertured sealing portion.

Part of the third apertured sealing portion may form part of the second apertured sealing portion. Part of an edge portion of the third apertured sealing portion may form part of an edge portion of the second apertured sealing portion. Part of an edge portion of the third apertured sealing portion may form part of a substantially curved edge portion of the second apertured sealing portion.

One, more or each edge portion of one, more or each apertured sealing portion may independently have a cross sectional shape which is at least partially circular. One, more or each edge portion of one, more or each apertured sealing portion may independently have a cross sectional shape which is at least partially polyhedral.

One, more or each edge portion of one, more or each apertured sealing portion may independently have a cross sectional shape which is substantially circular. One, more or each edge portion of one, more or each apertured sealing portion may independently have a cross sectional shape which is substantially polyhedral.

The seal may be formed of rubber, e.g. ethylene propylene diene monomer (EDPM) rubber.

According to a second aspect of the present invention, there is provided a plumbing fitting comprising one or more seals according to the first aspect of the present invention.

The plumbing fitting may be configurable (e.g. movable) between a two or more positions. The plumbing fitting may be configurable (e.g. movable) between a first position, a second position and a third position.

Each position may be independently selected from an operational position; an isolation position; and a flushing position, servicing position, maintenance position, bypass position and/or mechanism replacement position.

The first position may be an operational position.

The second position may be selected from an isolation position; or a flushing position, servicing position, maintenance position, bypass position and/or mechanism replacement position.

The third position may be selected from a flushing position, servicing position, maintenance position, bypass position and/or mechanism replacement position.

The plumbing fitting may be configurable (e.g. movable) between the respective positions manually, mechanically and/or electronically.

The plumbing fitting may comprise an outer body. The outer body may have a flow path extending therethrough.

The plumbing fitting may comprise an inner body. The inner body may be disposed in the outer body. The inner body may comprise, or be arranged to receive, e.g. releasably receive, a mechanism. The inner body may be configurable (e.g. movable) between the first position, the second position and, where present, the third position.

In one position (e.g. the first position) the flow path may extend through the inner body and the mechanism. In another position (e.g. the second position) the flow path may be blocked by an outer sealing (blocking) surface of the inner body. In yet another position (e.g. the third position) the flow path may bypass the mechanism via the inner body.

In one position an apertured sealing portion of the or each seal may effect a seal in the plumbing fitting. In one position an apertured sealing portion of the or each seal may effect a seal in the plumbing fitting and the other apertured sealing portion or portions of the or each seal may not effect a seal in the plumbing fitting.

In another position another apertured sealing portion of the or each seal may effect a seal in the plumbing fitting. In another position another apertured sealing portion of the or each seal may effect a seal in the plumbing fitting and the other apertured sealing portion or portions of the or each seal may not effect a seal in the plumbing fitting.

In the first position the first apertured sealing portion of the or each seal may effect a seal in the plumbing fitting. In the first position the first apertured sealing portion of the or each seal may effect a seal in the plumbing fitting and the other apertured sealing portion or portions of the or each seal may not effect a seal in the plumbing fitting.

In the second position the second apertured sealing portion of the or each seal may effect a seal in the plumbing fitting. In the second position the second apertured sealing portion of the or each seal may effect a seal in the plumbing fitting and the other apertured sealing portion or portions of the or each seal may not effect a seal in the plumbing fitting.

In the third position the third apertured sealing portion of the or each seal may effect a seal in the plumbing fitting. In the third position the third apertured sealing portion of the or each seal may effect a seal in the plumbing fitting and the other apertured sealing portion or portions of the or each seal may not effect a seal in the plumbing fitting.

According to a third aspect of the present invention, there is provided a plumbing fitting comprising: an outer body having a flow path extending therethrough; an inner body disposed in the outer body, the inner body comprising, or being arranged to receive, a mechanism; wherein the inner body is movable between a first, operational, position in which the flow path extends through the inner body and the mechanism, a second, isolation, position in which the flow path is blocked by an outer sealing (blocking) surface of the inner body, and a third position in which the flow path bypasses the mechanism via the inner body.

In use, in the first, operational, position the mechanism can perform its predetermined function (e.g. it may be a PICV and it may be used to regulate and control fluid flow and pressure). In the second, isolation, position the mechanism can be isolated from the flow path such that fluid is blocked from passing through the flow path. In the third position the mechanism can be accessed for maintenance or repair, whilst the fluid bypasses the mechanism and continues to flow through the flow path.

Accordingly, in embodiments, in the third position the mechanism can be maintained or repaired without isolating the plumbing fitting from the plumbing system to which it is connected. This can be more time and cost efficient than isolating the plumbing fitting, e.g. using valves on pipes upstream and/or downstream from the plumbing fitting. Also, in embodiments, in the third position the mechanism can be accessed for maintenance or repair without additional plumbing tools and/or without trained personnel. This can increase time and cost efficiency relative to known plumbing fittings. Moreover, in embodiments, the mechanism can be maintained or repaired using fewer steps than are required to maintain or repair known plumbing fittings. This can reduce the risk of introducing complications to the plumbing system to which the plumbing fitting is connected. Also, by virtue of the bypass position via the inner body, there is reduced risk of inadvertent fluid egress between the outer body and the inner body and the plumbing fitting can be flushed, not just isolated.

Thus, embodiments of the present invention provide a plumbing fitting that can be more conveniently and efficiently maintained or repaired than, and is less prone to inadvertent fluid egress relative to, known plumbing fittings.

The outer body may be a manifold. The outer body may comprise two or more connectors, each having a bore therethrough. Each connector may be adapted to connect to a pipe of a plumbing system. Each connector may be disposed on an outside of the outer body. There may be an inlet connector having an inlet bore. There may be an outlet connector having an outlet bore. The outer body may comprise a cavity in which the inner body is disposed. The cavity may be accessible through an opening provided on the outer body. The outer body may comprise at one end an opening to the cavity, and at the opposite end a closed base.

The flow path may extend between the inlet bore and the outlet bore. The flow path may be adapted to convey a liquid through the plumbing fitting. The flow path may be adapted to convey a liquid at non-ambient or elevated pressures.

The inner body may be a receptacle. The inner body may comprise and be arranged to receive (e.g. releasably receive) a mechanism. The inner body may be movable between the first, operational, position, the second, isolation, position, and the third position manually, mechanically and/or electronically. The inner body may be movable between the first, operational, position, the second, isolation, position, and the third position using movement means.

The movement means may be provided between the outer body and the inner body. The movement means may be provided between a surface of the outer body cavity and an outer surface of the inner body. The movement means may comprise one or more slide mechanisms.

The, more or each slide mechanism may comprise a guide and a slide that is slidable in the guide.

The guide may comprise one or more guide portions. The, more or each guide portion may be independently substantially straight or substantially curved. The, more or each guide portion may be independently inclined with respect to the longitudinal axis of the plumbing fitting, or (where present) the axis of axial movement.

The slide mechanism may be adapted to constrain movement of the inner body between the first, operational, position, the second, isolation, position, and the third position. The slide mechanism may prevent the inner body from being removed or inadvertently ejected from the outer body.

In the first, operational, position, the, more or each slide may be arranged at a first position within the corresponding guide; in the second, isolation, position, the, more or each slide may be arranged at a second position within the corresponding guide; and in the third position the, more or each slide may be arranged at a third position within the corresponding guide.

The movement means may be operable manually, mechanically and/or electronically. Any other suitable movement means may be used, as will be known to a person skilled in the art.

The inner body may be rotatable in relation to the outer body. The inner body may be movable between the first, operational, position, the second, isolation, position and the third position by rotation of the inner body relative to the outer body.

The inner body may be disposed in, and axially movable along an axis relative to, the outer body. The inner body may be disposed in, and axially movable along an axis relative to, the outer body via the movement means. This axis is referred to herein as 'the axis of axial movement'. The axis of axial movement may also be an axis of rotation, about which the inner body may be rotated to effect axial movement between the first, operational, position, the second, isolation, position and the third position. Such movement may be a result of the guiding of the inner body relative to the outer body caused by the interaction between the, more or each slide and the corresponding guide.

The inner body may comprise a cavity adapted to receive or releasably receive the mechanism. For example, the inner body cavity may comprise a screw thread. The screw thread may correspond to a screw thread on the mechanism.

The inner body may comprise two or more apertures. The apertures may comprise an inner body inlet and an inner body outlet. The inner body may comprise a bypass inlet and a bypass outlet. The inner body may comprise a bypass bore. The bypass bore may extend between the bypass inlet and the bypass outlet and be isolated from the mechanism.

The bypass bore may be displaced from the inlet bore and the outlet bore in the first, operational, position. The bypass bore may be displaced from the inlet bore and the outlet bore in the second, isolation, position. The bypass bore may be in alignment with the inlet bore and the outlet bore in the third position. The bypass bore may be provided between the inner body inlet and the base of the inner body.

In the first, operational, position fluid may flow through the flow path. In the first, operational, position the inner body inlet may align with the inlet bore. In the first, operational, position the inner body outlet may align with the outlet bore.

In use, in the first, operational, position fluid may flow into the inlet bore in the inlet connector, then through the inner body inlet and the mechanism, then through the inner body outlet, then through the outlet bore in the outlet connector.

In the second, isolation, position, fluid may not flow through the flow path. In the second, isolation, position, the inner body inlet may be displaced from the inlet bore. In the second, isolation, position, the inner body outlet may be displaced from the outlet bore. The outer sealing (blocking) surface of the inner body may be an outer sealing surface of the inner body.

In use, in the second, isolation, position, fluid may flow through the inlet bore in the inlet connector but may be prevented from further flowing through the flow path by the inner body.

In the third position fluid may flow through the flow path. In the third position the inner body inlet may be displaced from the inlet bore. In the third position the inner body outlet may be displaced from the outlet bore. In the third position the flow path through the outer body may be directed through the inner body (e.g. through the bypass bore e.g. via the bypass inlet and the bypass outlet). In the third position the mechanism may be releasable from the receptacle.

In use, in the third position fluid may flow through the inlet bore in the inlet connector, then through the inner body (e.g. via the bypass bore), then through the outlet bore in the outlet connector.

The plumbing fitting may comprise one or more (e.g. two) sealing members. The or each sealing member may be adapted to prevent inadvertent fluid egress from the plumbing fitting. The or each sealing member may be provided between the outer body and the inner body. The or each sealing member may be provided on the inner body and/or on the outer body. The or each sealing member may be inclined with respect to the longitudinal axis of the inner body, or (where present) the axis of axial movement. The or each sealing member may be independently selected from a sealing ring, such as an O-ring; and a seal according to a first aspect of the present invention. The plumbing fitting may comprise a first seal according to a first aspect of the present invention and/or a second seal according to a first aspect of the present invention.

The plumbing fitting may comprise one or more (e.g. two) seal tracks for receiving a sealing member. The or each seal track may be formed on the inner body and/or on the outer body. The or each seal track may be formed on the outer surface of the inner body and/or on a surface of the outer body cavity.

The or each seal track may be of a form which corresponds substantially to the form of a sealing member (e.g. the seal of the first aspect of the present invention). The or each seal track may comprise one or more sections. Each section may intersect a split line formed on the inner body at an intersection point. At each intersection point, each section may be substantially perpendicular to the respective split line. In this way, the seal track or tracks can be formed (e.g. injection moulded) without unwanted undercuts.

The or each seal may be received in a respective seal track.

Where the plumbing fitting comprises a first seal according to a first aspect of the present invention, in the first, operational position, the first apertured sealing portion of the first seal may be arranged to prevent fluid egress from the inlet bore and inner body inlet, between the outer body and the inner body; and/or in the second, isolation, position, the second apertured sealing portion of the first seal may be arranged to prevent fluid egress from the inlet bore and a first outer sealing (blocking) surface of the inner body, between the outer body and the inner body; and/or in the third position, the third apertured sealing portion of the first seal may be arranged to prevent fluid egress from the inlet bore and the bypass inlet, between the outer body and the inner body.

Where the plumbing fitting comprises a first seal according to a first aspect of the present invention, the edge portion or portions of the first apertured sealing portion of the first seal may be arranged around the inner body inlet; and/or the edge portion or portions of the second apertured sealing portion of the first seal may delimit the first outer sealing (blocking) surface of the inner body; and/or the edge portion or portions of the third apertured sealing portion of the first seal may be arranged around the bypass inlet.

The first outer sealing (blocking) surface of the inner body may be on an outer side surface of the inner body.

Where the plumbing fitting comprises a second seal according to a first aspect of the present invention, in the first, operational position, the first apertured sealing portion of the second seal may be arranged to prevent fluid egress from the outlet bore and inner body outlet, between the outer body and the inner body; and/or in the second, isolation, position, the second apertured sealing portion of the second seal may be arranged to prevent fluid egress from the outlet bore and a second outer sealing (blocking) surface of the inner body, between the outer body and the inner body; and/or in the third position, the third apertured sealing portion of the second seal may be arranged to prevent fluid egress from the outlet bore and the bypass outlet, between the outer body and the inner body.

Where the plumbing fitting comprises a second seal according to a first aspect of the present invention, the edge portion or portions of the first apertured sealing portion of the second seal may be arranged around the inner body outlet; and/or the edge portion or portions of the second apertured sealing portion of the second seal may delimit the second outer sealing (blocking) surface of the inner body; and/or the edge portion or portions of the third apertured sealing portion of the second seal may be arranged around the bypass outlet.

The second outer sealing (blocking) surface of the inner body may be on an outer side surface of the inner body.

The plumbing fitting may comprise a lock configured to releasably lock the inner body to the outer body in the first, operational, position and/or the second, isolation, position and/or the third position. In this way, the lock may prevent the inner body from inadvertently ejecting from the body. This could otherwise occur, e.g. due to a pressure surge. The lock may comprise one or more first locking portions adapted to interlock with one or more second locking portions. The or each first locking portion may be provided on the body. The or each second locking portion may be provided on the inner body. Any other suitable lock may be used, as will be known to a person skilled in the art. Non-limiting examples of other locks include clips and other suitable fastening means.

The plumbing fitting may comprise the mechanism. The mechanism may be releasably mounted in the inner body. The mechanism may be releasably mounted in the cavity provided in the inner body. The mechanism may be releasably mounted in the inner body by securing means. The securing means may comprise a screw and thread connection, twist connection or push-fit connection. Any other suitable securing means may be used, as will be known to a person skilled in the art. The mechanism may be manually, mechanically and/or electronically releasable from the inner body.

The plumbing fitting and/or the mechanism may be a valve, filter, measurement device or combination thereof. The mechanism may be selected from an anti-back-flow valve, commissioning valve, control valve, serviceable valve, metering valve, balancing valve, regulating valve, mixing valve, thermostatic valve, safety valve, isolation valve, dosing valve, service valve, filtration device, measuring device and combination thereof. In particular, the plumbing fitting and/or the mechanism may be a pressure independent control valve (PICV).

The third position may be a flushing position, servicing position, maintenance position, bypass position and/or mechanism replacement position.

Any features of any aspect of the present invention can be combined with any features of any other aspect of the present invention.

For example, the skilled person will appreciate that the optional features in respect of the first aspect or other aspects of the present invention may apply in respect of the other aspects of the present invention.

DETAILED DESCRIPTION OF THE INVENTION

In order that the invention may be more clearly understood one or more embodiments thereof will now be described, by way of example only, with reference to the accompanying drawings, of which:

Figure 1:
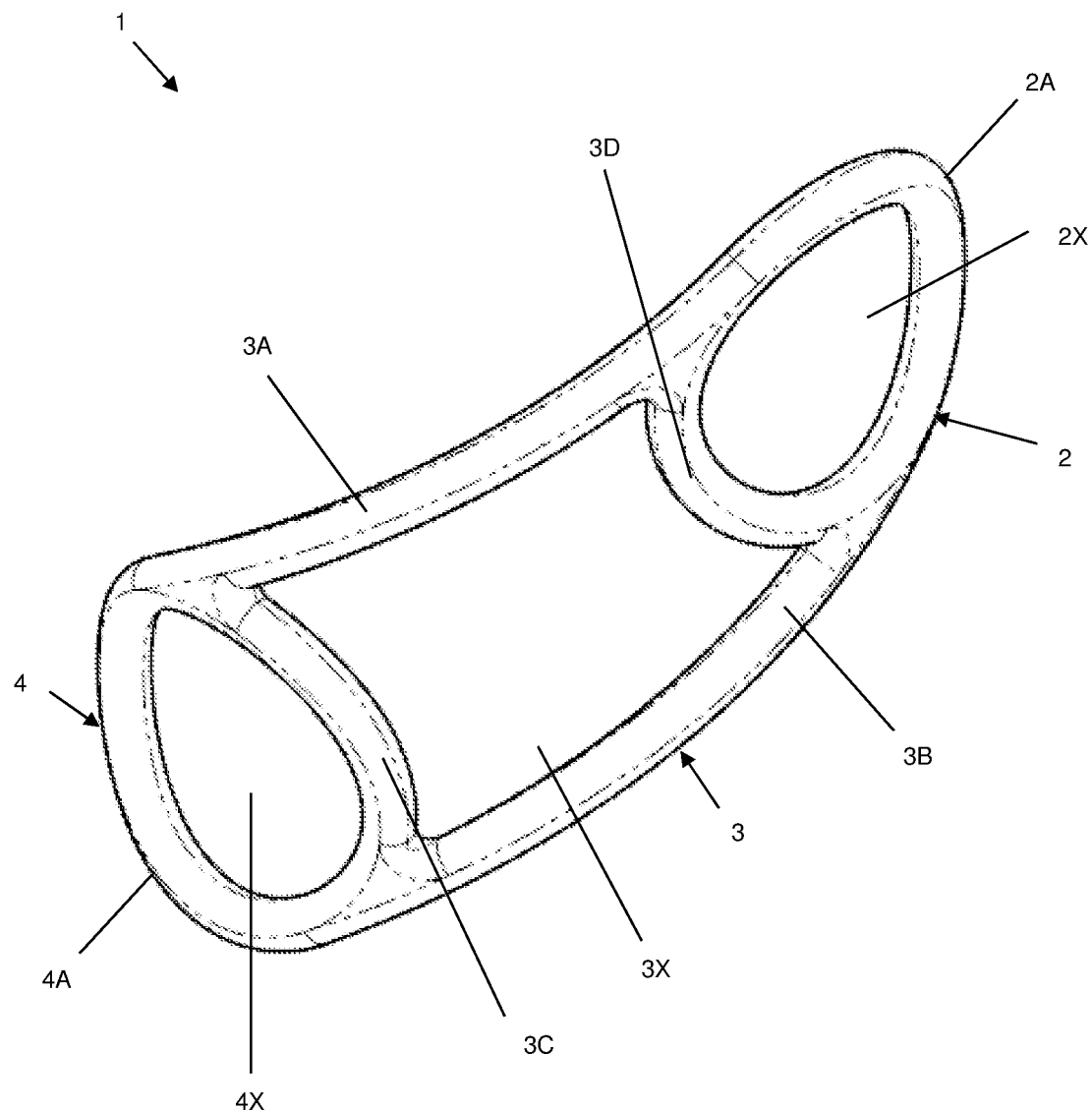
FIG. 1 shows a seal according to the invention.

With reference to FIG. 1, a seal 1 is shown which is described herein as a 'tandem O-ring seal'.

The seal 1 comprises a first apertured sealing portion 2; a second apertured sealing portion 3; and a third apertured sealing portion 4, the second apertured sealing portion 3 being arranged between the second apertured sealing portion 3 and the third apertured sealing portion 4. The first apertured sealing portion 2 is substantially ring-shaped and comprises an edge portion 2A enclosing an aperture 2X. The third apertured sealing portion 4 is substantially ring-shaped and comprises an edge portion 4A enclosing an aperture 4X. The first apertured sealing portion 2 and the third apertured sealing portion 4 are of substantially the same form.

The second apertured sealing portion 3 is of a substantially rectangular shape, with two, spaced apart, long edge portions 3A, 3B and two, spaced apart, short edge portions 3C, 3D, which edge portions enclose an aperture 3X. Each of the long edge portions 3A, 3B is substantially linear and each of the short edge portions 3C, 3D is substantially curved. The long edge portions 3A, 3B are laterally joined together by the short edge portions 3C, 3D. Each of the short edge portions 3C, 3D is convex when viewed from between those short edge portions 3C, 3D.

One of the short edge portions 3C of the second apertured sealing portion 3 forms part of the edge portion 2A of the first apertured sealing portion 2. The other of the short edge portions 3D of the second apertured sealing portion 3 forms part of the edge portion of the 4A of the third apertured sealing portion 4.

Each edge portion 2A, 3A, 3B, 3C, 3D of the first apertured sealing portion 2, the second apertured sealing portion 3 and the third apertured sealing portion 4 has a cross sectional shape which is substantially circular.

The first, second and third apertured sealing portions 2, 3 and 4 are integrally formed in the sense that they are made of the same piece of injection moulded EDPM rubber.

With reference to FIGS. 2A-7, a plumbing fitting 100 comprises: an outer body 101 having a flow path 102 extending therethrough; an inner body in the form of a receptacle 103 disposed in the outer body 101; and a functional mechanism 104 releasably received in the inner body 103. The mechanism 104 is that of a pressure independent control valve (PICV), but a person skilled in the art will appreciate that the mechanism 104 may be any suitable mechanism.

The outer body 101 has a connector inlet 105 and a connector outlet 106 disposed on opposing, outer surfaces of the outer body 101, arranged co-axially, with their axes substantially perpendicular to the longitudinal axis of the outer body 101, the inner body 103 and the mechanism 104. The connector inlet and outlet 105, 106 are adapted to connect to pipes of a plumbing system (not shown). The flow path 102 extends through and between the connectors 105, 106 via an inlet bore in the inlet connector 105 to an outlet bore in the outlet connector 106. The outer body 101 has at one end an opening to a cavity, the opening defined by an annular lip 107; and at an opposite end a closed base 108. The outer body cavity is adapted to receive the inner body 103 to thereby provide a secure fit between the outer body 101 and the inner body 103. The outer body 101 has a drain port 140 for draining a bypass bore 136 (as discussed below). The drain port 140 is arranged on an outer surface of the outer body 101, towards the closed base 108 of the outer body 101.

The inner body 103 has an inner body inlet 111 and an inner body outlet 112 disposed on opposing, outer surfaces thereof. The inner diameters of the inner body inlet 111 and the inner body outlet 112 are substantially the same as the inner diameters of the inlet bore and the outlet bore. The inner body 103 has a bypass inlet 118 and a bypass outlet 119 between which a bypass bore 136 extends, which bypass inlet 118 and bypass outlet 119 are substantially identical in form and are provided coaxially at opposing circumferential surfaces of the inner body 103, with the axis of the bypass bore 136 substantially perpendicular to the axis of rotation of the inner body 103 (axis Z in FIGS. 2A, 3A and 4A). The bypass bore 136 is provided below the inner body inlet 111 and the inner body outlet 112. The longitudinal axis of the bypass bore 136 is substantially perpendicular to the axis between the inner body inlet 111 and the inner body outlet 112.

The inner body 103 has a substantially cylindrical form, with at one end an opening 113 to a cavity for releasably receiving the mechanism 104, and at an opposite end a closed base 114. An annular rim 115 defines the inner body cavity opening 113, and is provided with a textured surface (not shown) so that the annular rim 115 can effectively function as gripping means.

Figure 5:
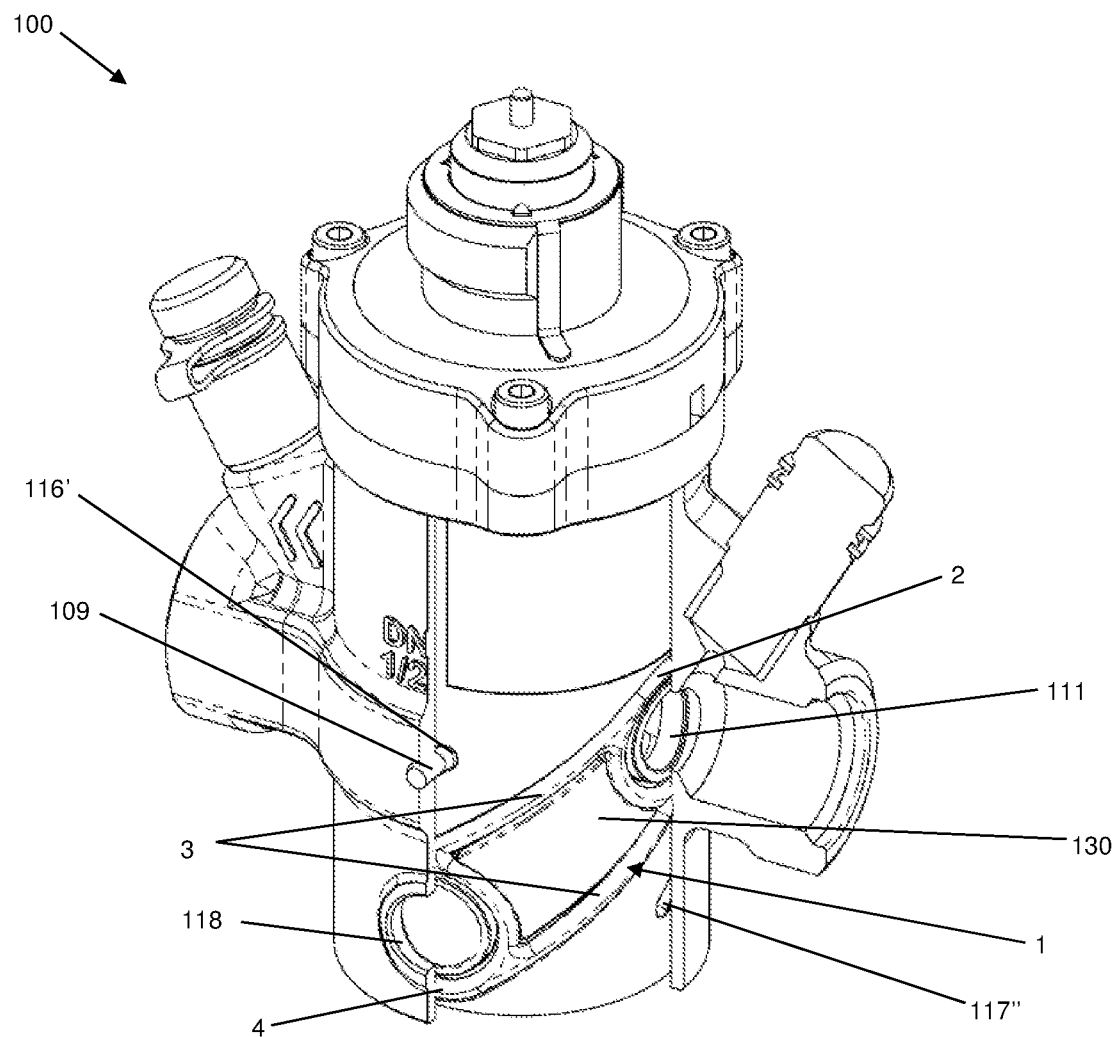
FIG. 5 shows an alternative view of the plumbing fitting of FIG. 2A, wherein the plumbing fitting is configured in an operational position.
Figure 6:
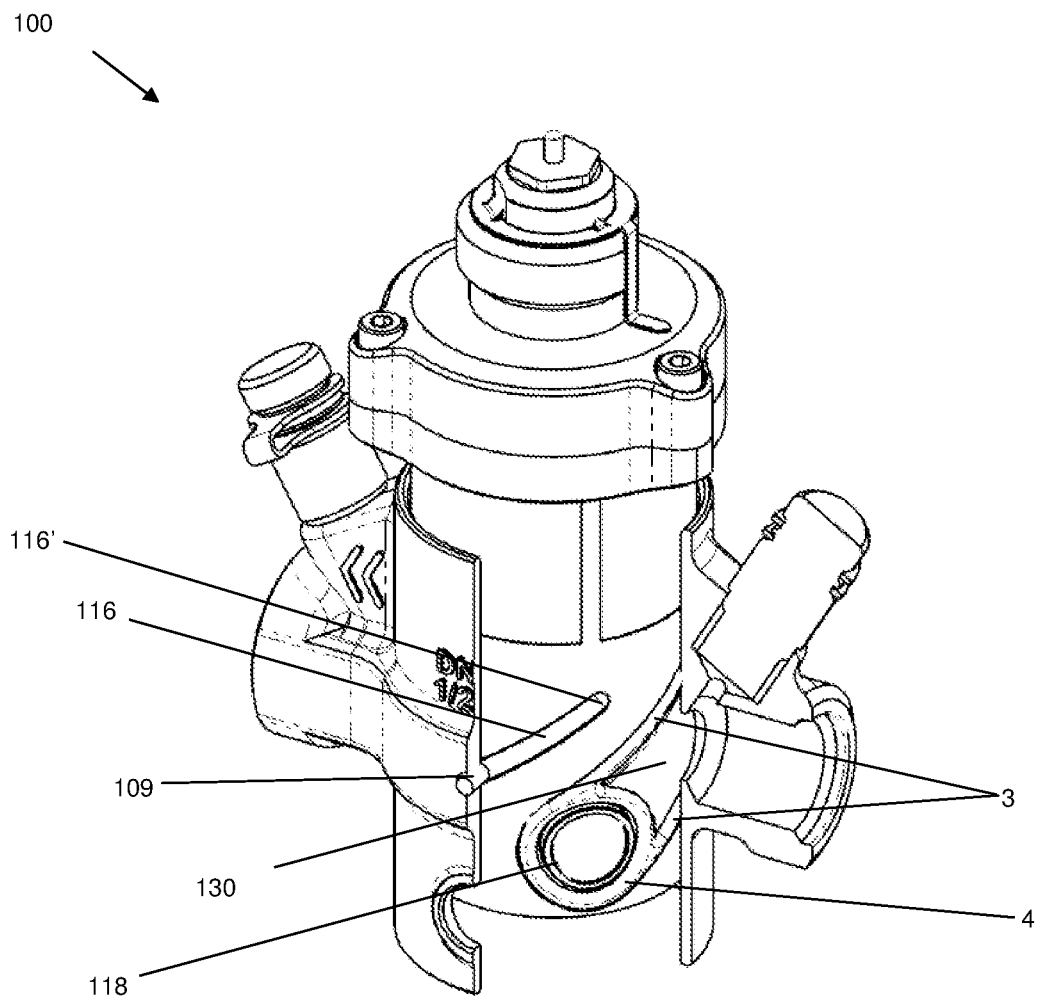
FIG. 6 shows an alternative view of the plumbing fitting of FIG. 2A, wherein the plumbing fitting is configured in an isolation position.
Figure 7:
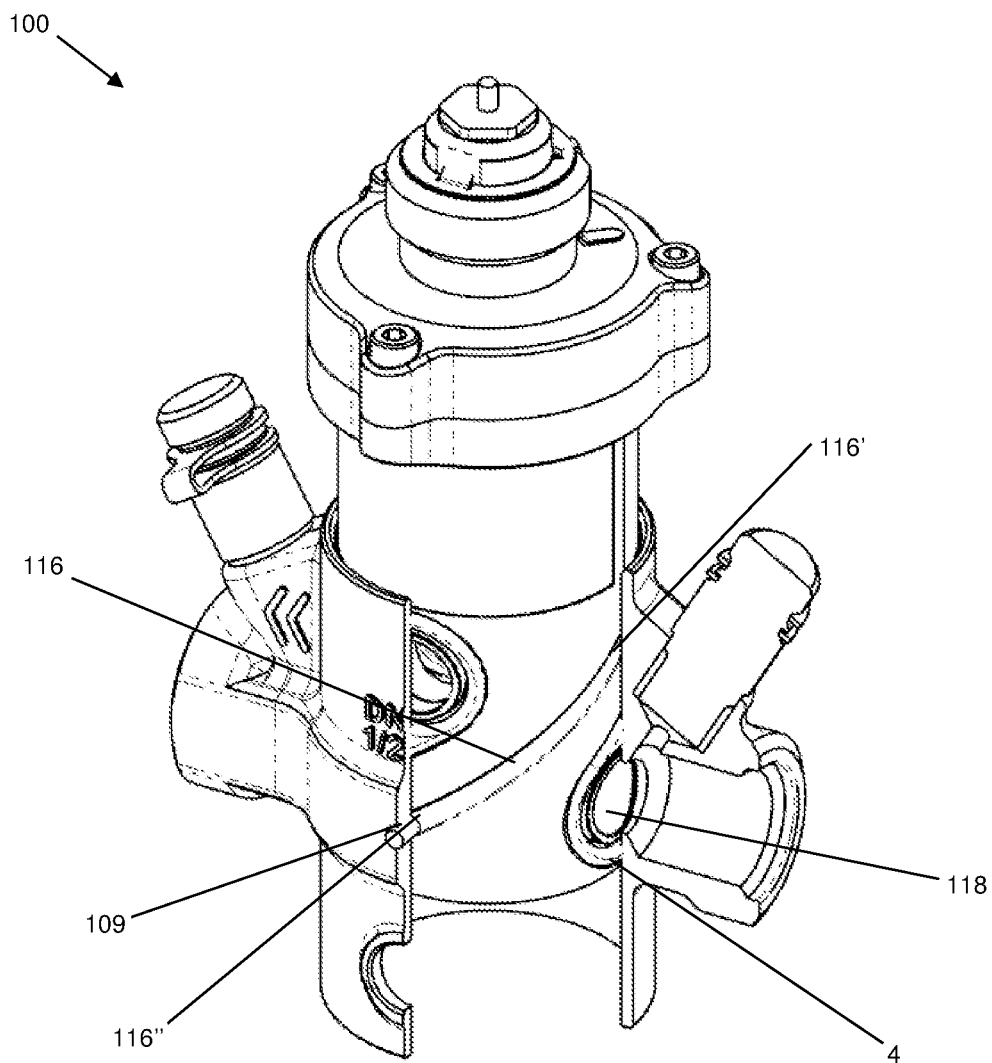
FIG. 7 shows an alternative view of the plumbing fitting of FIG. 2A, wherein the plumbing fitting is configured in a bypass position.

The outer body 101 comprises a first projection 109 and a second projection. The first projection 109 and the second projection are substantially identical in form and are provided coaxially in opposing circumferential surfaces of the outer body 101, with their axes substantially perpendicular to the longitudinal axis of the outer body 101, the inner body 103 and the mechanism 104. The first projection 109 is shown in FIGS. 5-7. The second projection is not shown but its form and configuration will be apparent to a person skilled in the art in view of this specification.

Figure 8:
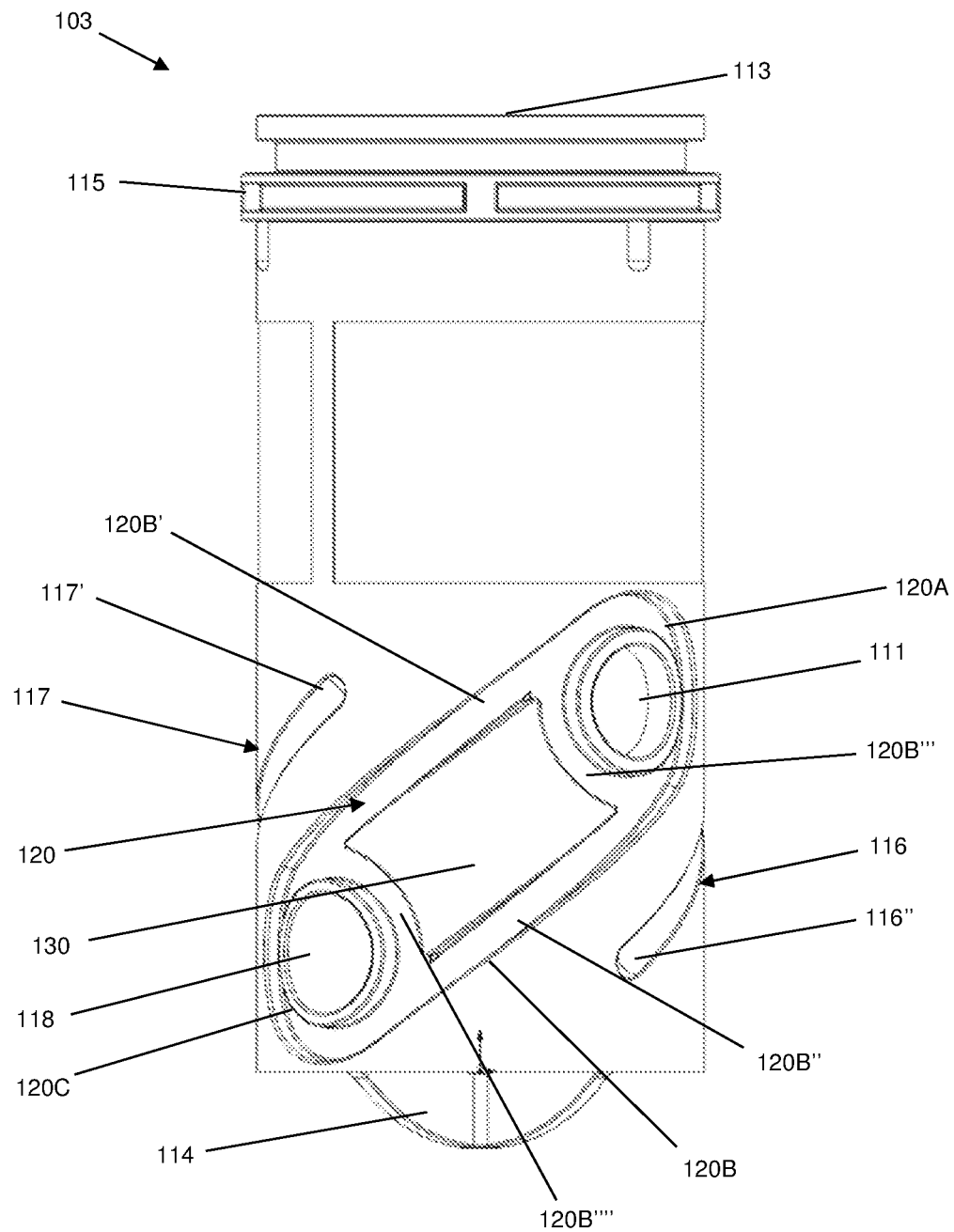
FIG. 8 shows an inner body of the plumbing fitting of FIG. 2A.
Figure 9:
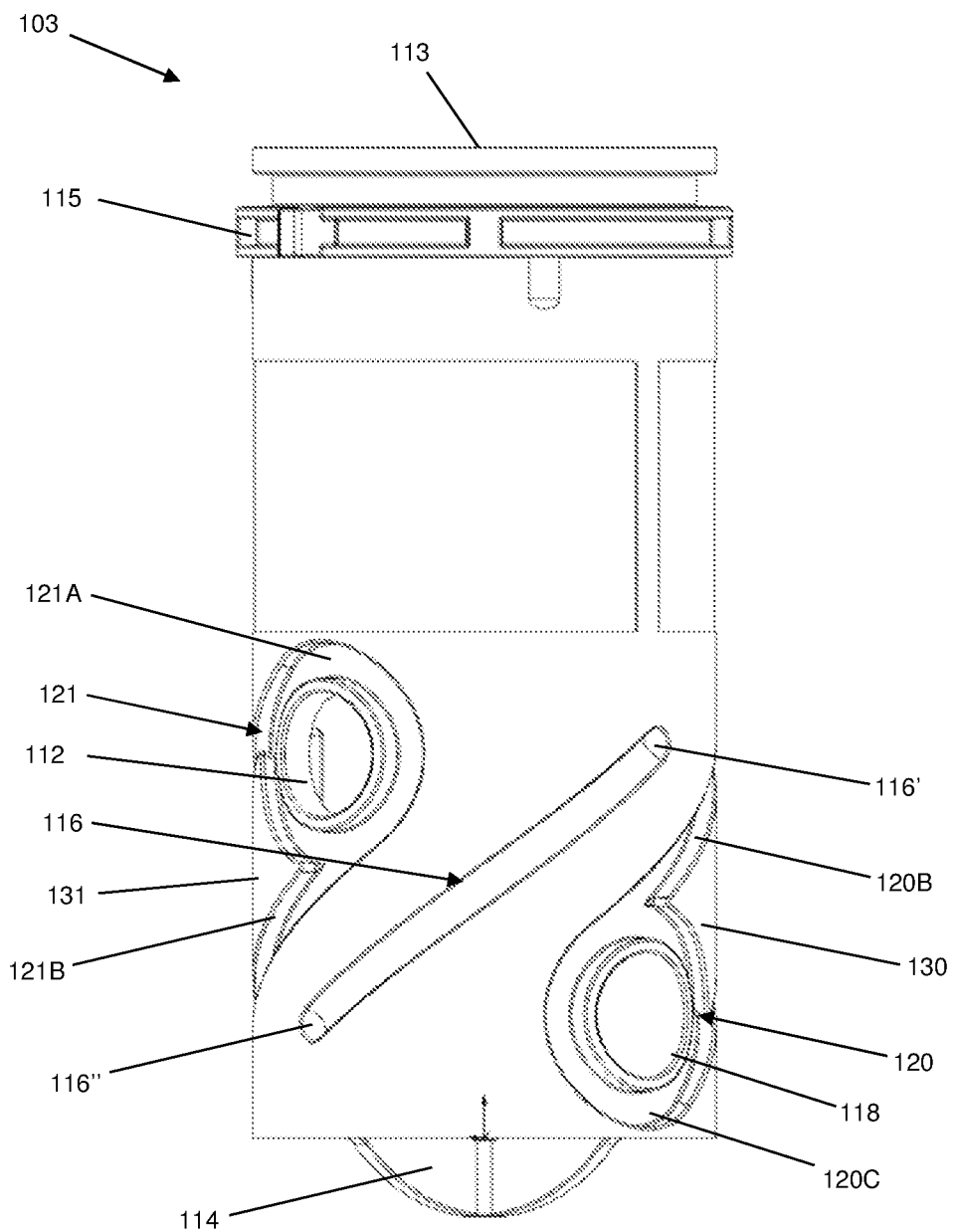
FIG. 9 shows an alternative view of the inner body of FIG. 8.

The inner body 103 comprises a first projection track 116 and a second projection track 117, as shown in FIGS. 8 and 9. The first and second projection tracks 116, 117 are recessed into outer circumferential surfaces of the inner body 103. The first projection track 116 and the second projection track 117 are substantially identical in form and are provided coaxially at opposing circumferential surfaces of the inner body 103. Each of the first projection track 116 and the second projection track 117 traces an arc of the circumferential surface of the inner body 103, the arc having a central angle of approximately 90 degrees. The first projection track 116 and the second projection track 117 are superimposable on each other by rotation about the longitudinal axis of the inner body 103.

Each of the first projection track 116 and the second projection track 117 is substantially straight, and is closed at each end thereof. At each closed end of the first projection track 116 there is provided a respective notch 116', 116" for receiving the first projection 109. At each closed end of the second projection track 117, there is provided a respective notch 117', 117" for receiving the second projection. Each respective notch 116', 116", 117', 117" extends deeper into the inner body 103 than the remainder of the first and second projection tracks 116, 117. One of the notches of the second projection track 117 is not shown in the drawings, but its form and configuration will be apparent to a person skilled in the art in view of this specification.

Each of the first projection track 116 and the second projection track 117 has an angle of inclination of about 45 degrees relative to the axis of rotation of the inner body 103, which is also the axis of axial movement of the inner body 101 (axis Z in FIGS. 2A, 3A and 4A), i.e. defined by the axial translation of the inner body 103 relative to the outer body 101 on moving between the first position, the second position and the third position, which movement and positions are discussed in more detail below.

Each of the first projection 109 and the second projection is a grub screw with a ball bearing tip, the screw having a thread that engages with a corresponding thread on the outer body 101, such that each of the first projection 109 and the second projection can be extended into, and retracted from, the outer body cavity. A person skilled in the art will appreciate that other types of projections may be used.

As mentioned, the first projection 109 projects into the first projection track 116 and the second projection projects into the second projection track 117. Twisting the inner body 103 relative to the outer body 101 causes the first projection 109 to follow the first projection track 116 and the second projection to follow the second projection track 117, to thereby rotationally (about axis Z) and translationally (along axis Z) move the inner body 103 relative to the outer body 101. The rotational movement is caused by rotation of the inner body 103 about axis Z relative to the outer body 101. The translational movement is caused by the interaction between the first and second projections 109 and the corresponding first and second projection tracks 116, 117, in which the inner body 103 is required to translate along axis Z to allow the first and second projections 109 to follow the corresponding first and second projection tracks 116, 117.

The inner body 103 comprises a first seal track 120 and a second seal track 121, which are best shown in FIGS. 8 and 9. The first seal track 120 and the second seal track 121 are substantially identical in form and are recessed into diametrically opposing circumferential surfaces of the inner body 103. Each of the first seal track 120 and the second seal track 121 traces an arc of the circumferential surface of the inner body 103, the arc having a central angle of approximately 90 degrees. The first seal track 120 and the second seal track 121 are superimposable on each other by rotation about the longitudinal axis of the inner body 103.

The first seal track 120 comprises a first apertured sealing portion track 120A; a second apertured sealing portion track 120B; and a third apertured sealing portion track 120C, the first, second and third apertured sealing portion tracks 120A-C being integrally formed with, and continuously transitioning into, each other. The first and third apertured sealing portion tracks 120A, 120C of the first seal track 120 are of substantially the same, substantially annular (i.e. ring) shape. The second apertured sealing portion track 120B of the first seal track 120 is of a substantially rectangular shape, with two, spaced apart, long edge tracks 120B', 120B"; and two, spaced apart, short edge tracks 120B'", 120B"". Each of the long edge tracks 120B', 120B" of the first seal track 120 is substantially linear and each of the short edge tracks 120B'", 120B"" of the first seal track 120 is substantially curved. Each of the short edge tracks 120B'", 120B"" of the first seal track 120 is convex when viewed from between those short edge tracks 120B'", 120B"". The shape and dimensions of the first seal track 120 correspond with the shape and dimensions of the tandem O-ring seal 1 of FIG. 1, as, in use, the seal track 120 receives a seal 1.

The second seal track 121 comprises a first apertured sealing portion track 121A; a second apertured sealing portion track 121B; and a third apertured sealing portion track (not shown in the Figs. but its position will be apparent to a person skilled in the art), the first, second and third apertured sealing portion tracks being integrally formed with, and continuously transitioning into, each other. The first 121A and third apertured sealing portion tracks of the second seal track 120 are of substantially the same, substantially annular (i.e. ring) shape. The second apertured sealing portion track 121B of the second seal track 121 is of a substantially rectangular shape, with two, spaced apart, long edge tracks (not shown in the Figs. but their form and configuration will be apparent to a person skilled in the art in view of this specification); and two, spaced apart, short edge tracks (not shown in the Figs. but their form and configuration will be apparent to a person skilled in the art in view of this specification). Each of the long edge tracks of the second seal track 121 is substantially linear and each of the short edge tracks of the second seal track 121 is substantially curved. Each of the short edge tracks of the second seal track 121 is convex when viewed from between those short edge tracks. The shape and dimensions of the second seal track 121 correspond with the shape and dimensions of the tandem O-ring seal 1 of FIG. 1, as, in use, the seal track 121 receives a seal 1.

The first seal track 120 is arranged such that its first apertured sealing track 120A is formed around the periphery of the inner body inlet 111; its second apertured sealing track 120B is formed around a outer circumferential sealing surface (i.e. a blocking surface) 130 of the inner body 103; and its third apertured sealing track 120C is formed around the periphery of the bypass inlet 118.

The second seal track 121 is arranged such that its first apertured sealing track 121A is formed around the periphery of the inner body outlet 112; its second first apertured sealing track 121B is formed around a circumferential outer sealing surface (i.e. a blocking surface) 131 of the inner body 103; and its third first apertured sealing track is formed around the periphery of the bypass outlet 119.

As shown in part in FIGS. 5-7, a first seal 1 and a second seal 1, each being a seal of FIG. 1, are arranged respectively in the first seal track 120 and the second seal tracks 121.

The first seal 1 is arranged so that its first apertured sealing portion 2 is received in the first apertured sealing track 120A, its second apertured sealing portion 3 is received in the second apertured sealing track 120B, and its third apertured sealing portion 4 is received in the third apertured sealing track 120C. The first seal 1 projects out of the first seal track 120 to a suitable degree, such that in use the first seal 1 can form an effective seal (as discussed below in more detail). A person skilled in the art will know how to suitably size the first seal 1 relative to the first seal track 120.

The second seal 1 is arranged so that its first apertured sealing portion 2 is received in the first apertured sealing track 121A, its second apertured sealing portion 3 is received in the second apertured sealing track 121B, and its third apertured sealing portion 4 is received in the third apertured sealing portion track. The second seal 1 projects out of the second seal track 121 to a suitable degree, such that in use the second seal 1 can form an effective seal (as discussed below in more detail). A person skilled in the art will know how to suitably size the second seal 1 relative to the second seal track 121.

Figure 2A:
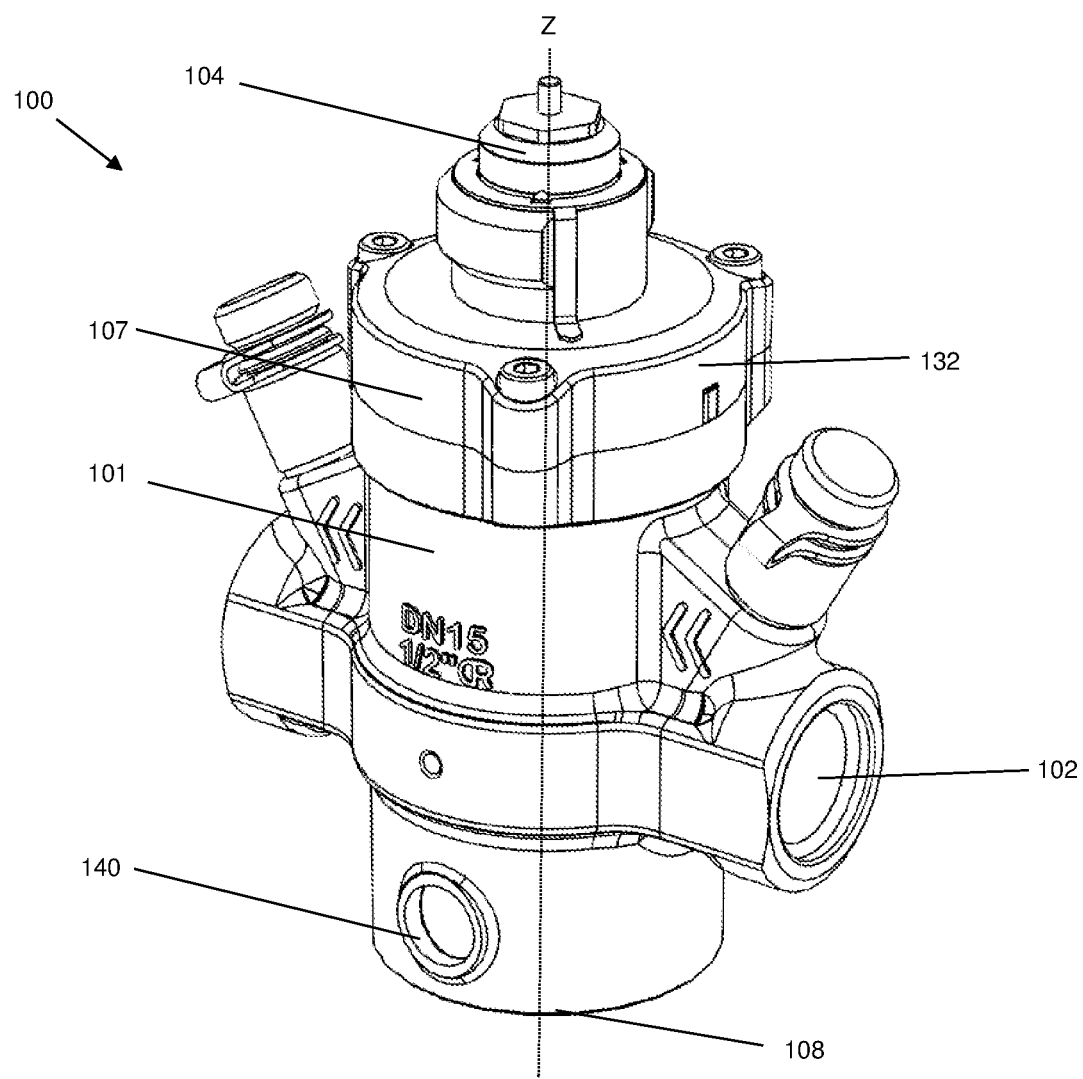
FIG. 2A shows a perspective view of a plumbing fitting comprising the seal of FIG. 1, wherein the plumbing fitting is configured in an operational position.
Figure 2B:
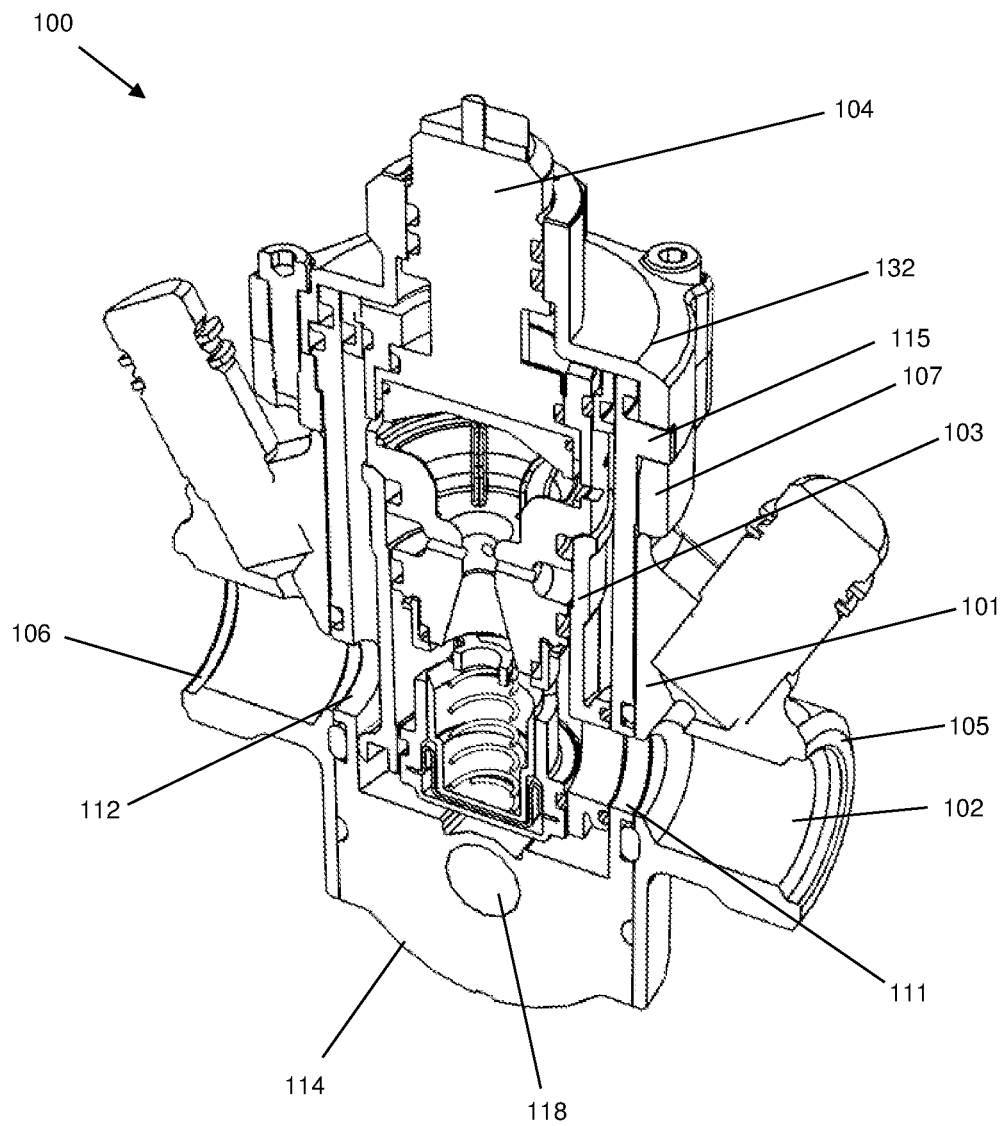
FIG. 2B shows a cross sectional view of the plumbing fitting of FIG. 2A.
Figure 3A:
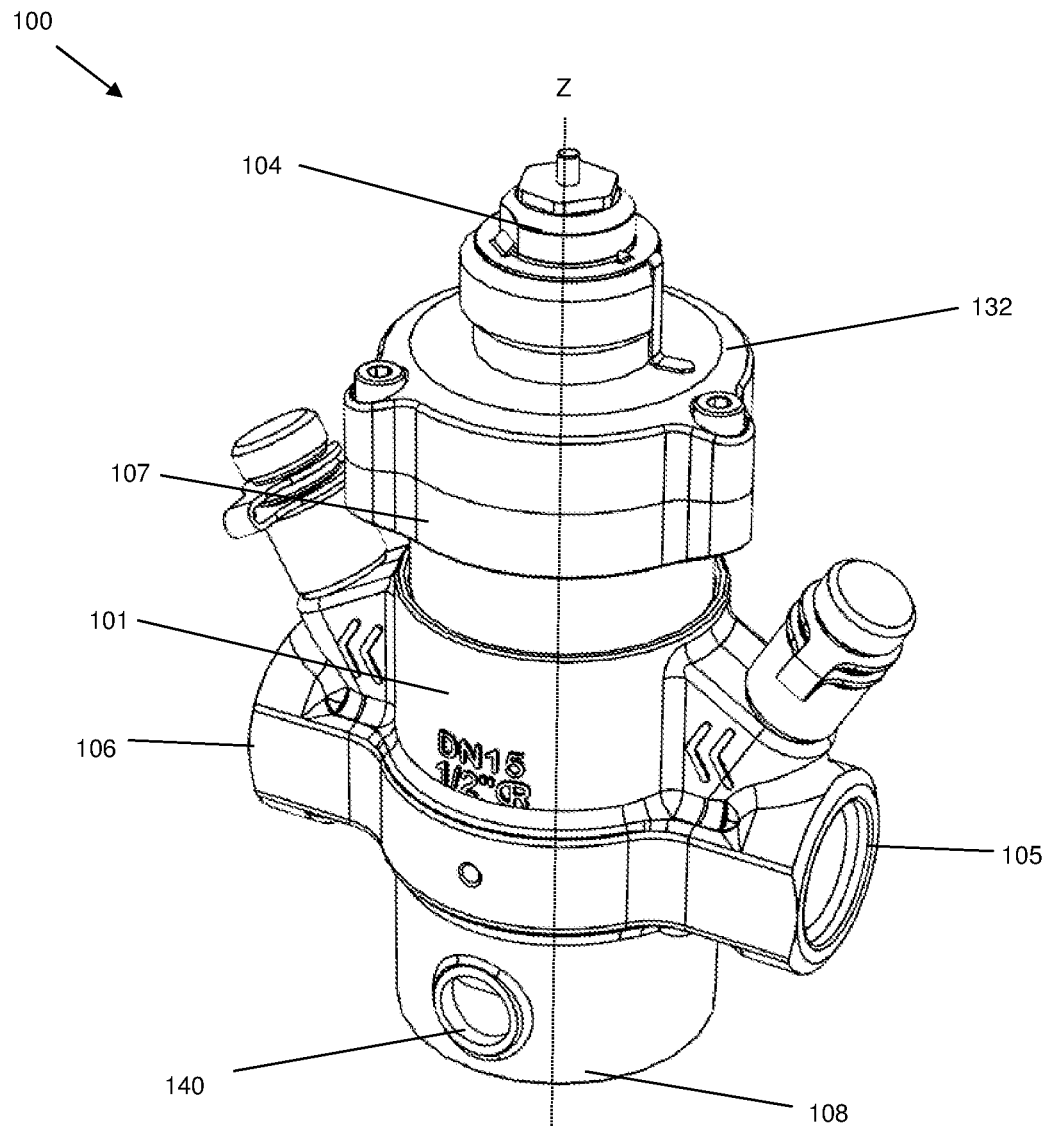
FIG. 3A shows a perspective view of the plumbing fitting of FIG. 2A, wherein the plumbing fitting is configured in an isolation position.
Figure 3B:
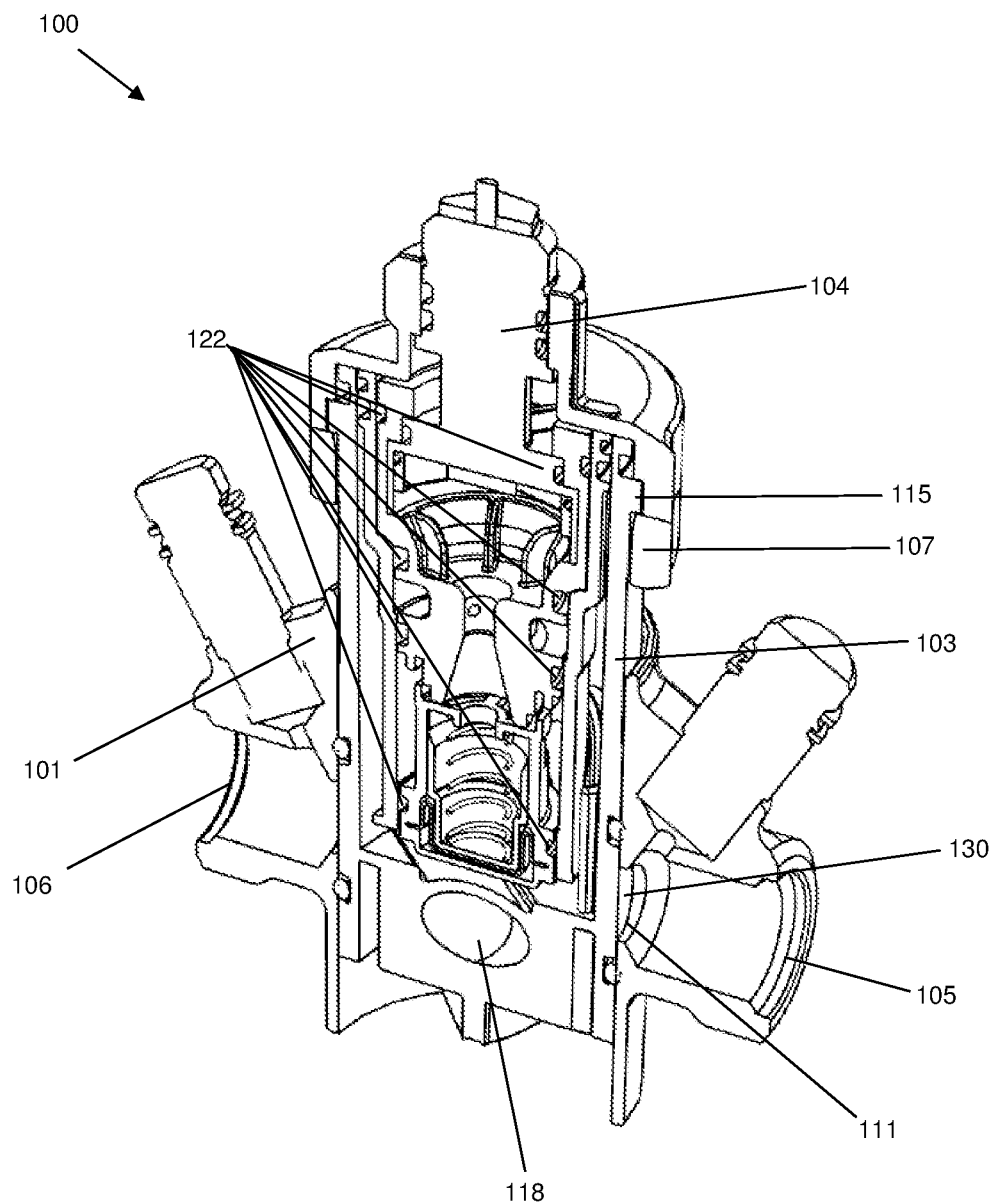
FIG. 3B shows a cross sectional view of the plumbing fitting of FIG. 3A.
Figure 4A:
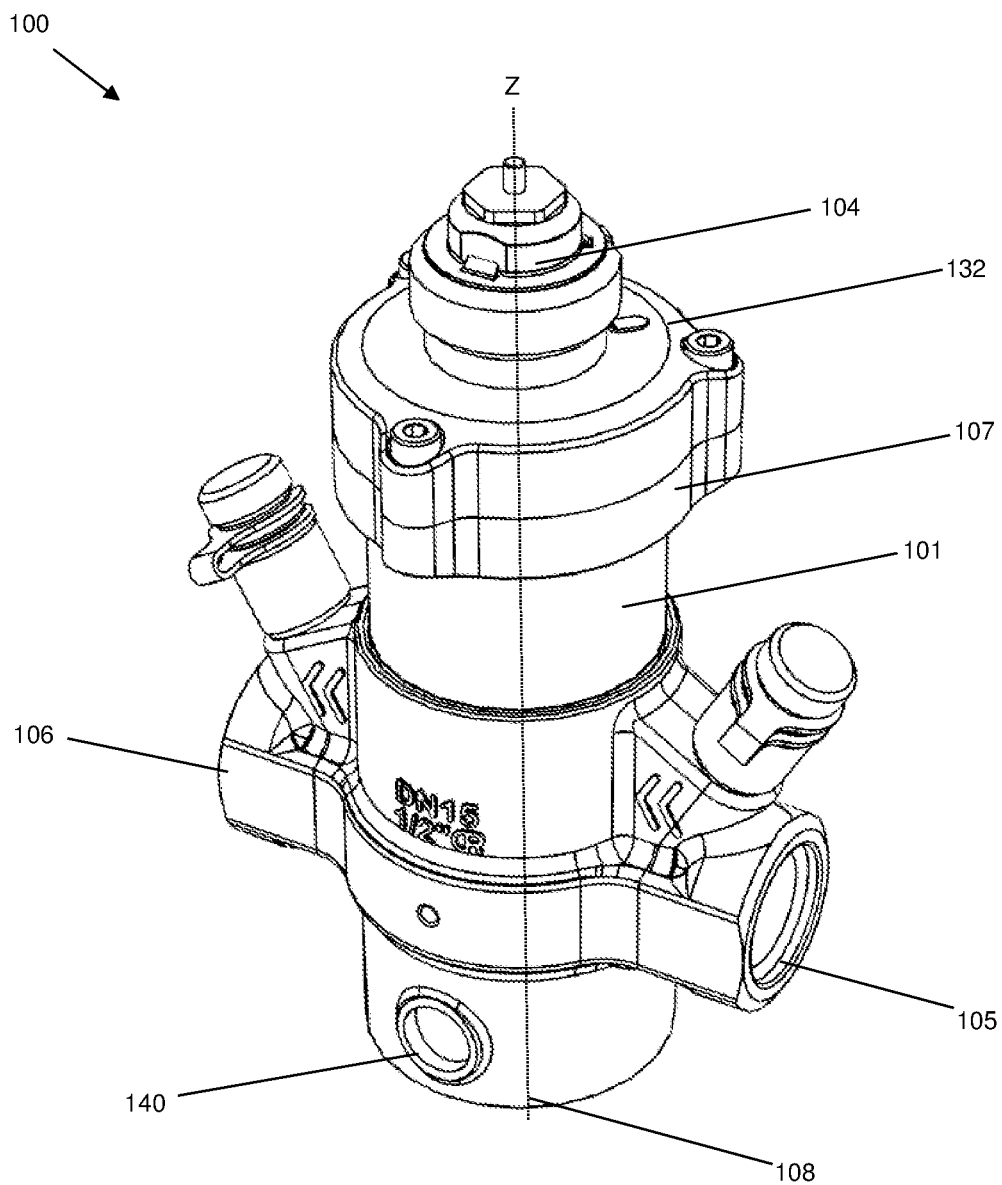
FIG. 4A shows a perspective view of the plumbing fitting of FIG. 2A, wherein the plumbing fitting is configured in a bypass position.
Figure 4B:
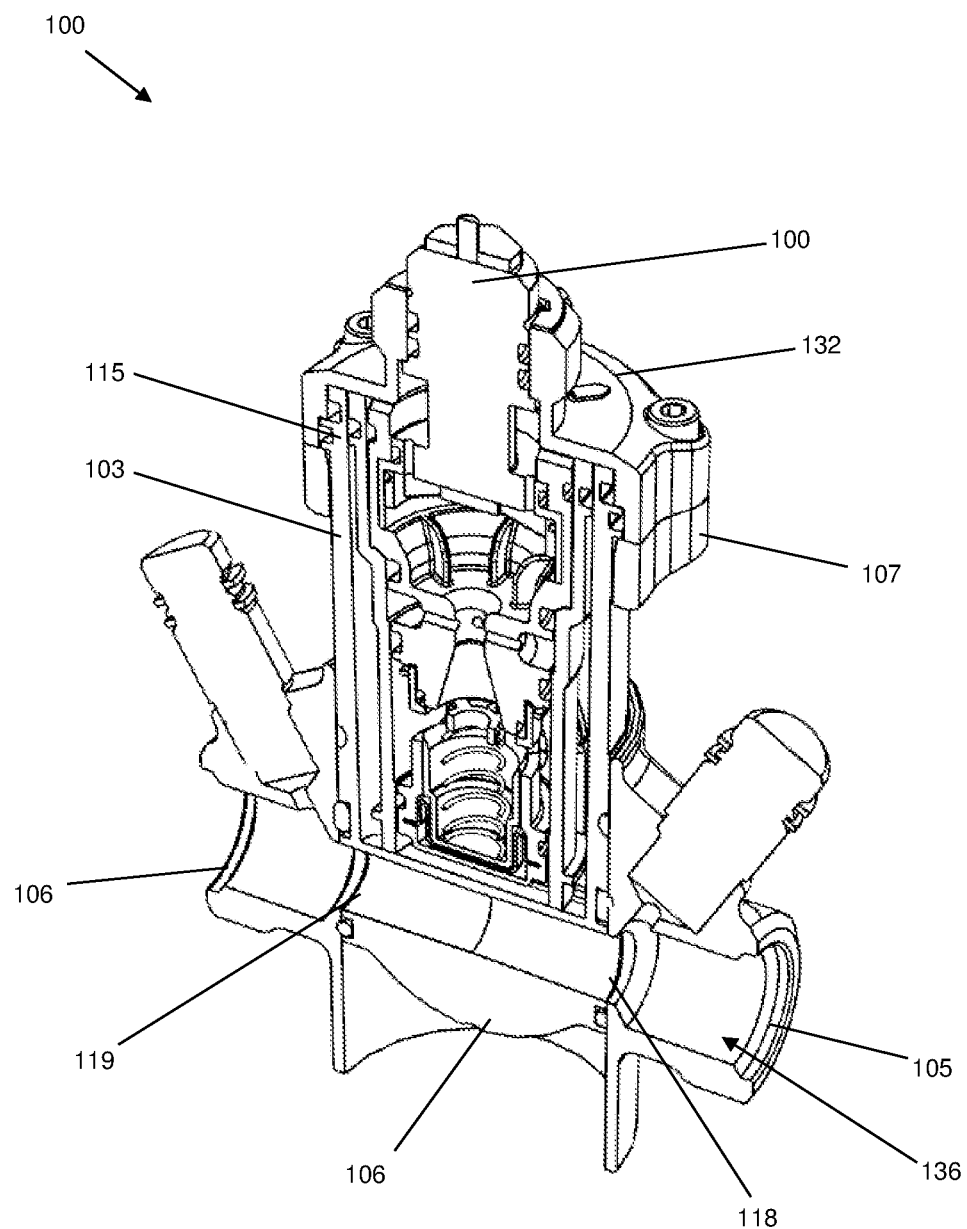
FIG. 4B shows a cross sectional view of the plumbing fitting of FIG. 4A.

The inner body 103 can be moved between a first, operational, position (as shown in FIGS. 2A, 2B and 5) in which the flow path 102 extends through the inner body 103 and the mechanism 104; a second, isolation, position (as shown in FIGS. 3A, 3B and 6) in which the flow path 102 is blocked by an outer circumferential surface of the inner body 103; and a third, bypass, position (as shown in FIGS. 4A, 4B and 7) in which the flow path 3 bypasses the mechanism 5 whereby in the bypass position, the mechanism 5 can be released from the receptacle 4 whilst a fluid flows through the flow path 3.

In the first, operational, position, the first projection 109 is arranged in the first projection track 116 adjacent to the first projection track notch 116', and the second projection is arranged in the second projection track 117 adjacent to the second projection track notch 117'. Here, the annular lip 107 is flush with the annular rim 115, the inlet bore aligns with the inner body inlet 111, and the outlet bore aligns with the inner body outlet 112.

In the second, isolation, position, the first projection 109 is arranged in the first projection track 116, approximately mid-way between the first projection track notches 116' and 116"; and the second projection is arranged in the second projection track 117, approximately mid-way between the second projection track notches 117' and 117". Here, the annular lip 107 is spaced from the annular rim 115; the inner body inlet 111 is rotationally (about axis Z) and axially (along axis Z) displaced from the inlet bore, and the inner body outlet 112 is rotationally (about axis Z) and axially (along axis Z) displaced from the outlet bore, such that the inlet bore is adjacent to the outer circumferential sealing surface 130 of the inner body 103, and the outlet bore is adjacent to the outer circumferential sealing surface 131 of the inner body 103. Here, the inner body 102 is rotated by approximately 45 degrees (about axis Z) relative to the outer body 101.

In the third, bypass, position, the first projection 109 is arranged in the first projection track 116 adjacent to the first projection track notch 116"; and the second projection is arranged in the second projection track 117 adjacent to the second projection track notch 117". Here, the annular rim 17 is further spaced (relative to the isolation position) from the annular lip 107; the inner body inlet 111 is rotationally (about axis Z) and axially (along axis Z) displaced from the inlet bore, and the inner body outlet 112 is rotationally (about axis Z) and axially (along axis Z) displaced from the outlet bore, such that the bypass inlet 118 is in alignment with the inlet bore and the bypass outlet 119 is in alignment with the outlet bore. Here, the inner body 102 is rotated by approximately 90 degrees (about axis Z) relative to its arrangement in the operational position.

The functions of the tandem O-ring seals 1 in the plumbing fitting 100, on moving between the operational, isolation and bypass positions, are described below.

With reference in particular to FIG. 5, when the plumbing fitting 1 is arranged in the operational position, the first apertured sealing portion 2 in the first sealing track 120 prevents fluid egress from the inlet bore or inner body inlet 111, between the outer body 101 and the inner body 103; and the first apertured sealing portion 2' in the second sealing track 121 prevents fluid egress from the outlet bore or inner body outlet 112, between the outer body 101 and the inner body 103.

With reference in particular to FIG. 6, when the plumbing fitting 1 is arranged in the isolation position, the second apertured sealing portion 3 in the first sealing track 120 prevents fluid egress from the inlet bore and the sealing surface 130 on the outer circumferential surface of the inner body 103, between the outer body 101 and the inner body 103; and the second apertured sealing portion 3' in the second sealing track 121 prevents fluid egress from the outlet bore and the sealing surface 131 on an outer circumferential surface of the inner body 103, between the outer body 101 and the inner body 103.

With reference in particular to FIG. 7, when the plumbing fitting 1 is arranged in the bypass position, the third apertured sealing portion 4 in the first sealing track 120 prevents fluid egress from the inlet bore or bypass inlet 118, between the outer body 101 and the inner body 103; and the third apertured sealing portion 4' in the second sealing track 121 prevents fluid egress from the outlet bore or bypass outlet 119, between the outer body 101 and the inner body 103.

The plumbing fitting 100 comprises a screw and thread arrangement (not shown) adapted to releasably secure the mechanism 104 to the inner body 103. In this way, the mechanism 104 can be released from the inner body 103 in the bypass position (and, optionally, in the isolation position). When the mechanism 104 is secured within the inner body 103, the plumbing fitting 100 can be moved from the isolation position or bypass position (as applicable) to a different position.

The inner body 103 comprises a number of internal sealing surfaces arranged to receive sealing rings 122 (only shown in FIG. 2B for clarity) of the mechanism 104. The mechanism sealing rings 122 are operable to prevent leakage of fluid between the mechanism 5 and the inner body cavity.

To move the plumbing fitting 1 between the operational position and the isolation position, the inner body 103 is twisted by approximately 45 degrees relative to the outer body 101. This can be conveniently performed by hand, by gripping the textured surface of the annular rim 115 and twisting the inner body 103 relative to the outer body 101. Movement of the inner body 103 relative to the outer body 101 is confined by movement of the first and second projections 109 within the first and second projection tracks 116, 117, and the respective closed end points of the first and second projection tracks 116, 117. On moving the plumbing fitting 1 between the operational position and the isolation position, the first projection 109 moves within the first projection track 116 (i.e. from the first projection track notch 116' towards the first projection track notch 116", or vice-versa) and the second projection moves within the second projection track 117 (i.e. from the second projection track notch 117' towards the second projection track notch 117", or vice-versa), causing the inner body 103 to translate axially (along axis Z) and rotate (about axis Z) relative to the outer body 101.

To move the plumbing fitting 1 between the isolation position and the bypass position, the inner body 103 is twisted by (a further) approximately 45 degrees relative to the outer body 101, again using the textured surface of the annular rim 115. On moving the plumbing fitting 1 between the isolation position and the bypass position, the first projection 109 moves within the first projection track 116 (i.e. from mid-way between the first projection track notches 116' and 116" towards the first projection track notch 116", or towards the first projection track notch 116') and the second projection moves within the second projection track 117 (i.e. from mid-way between the second projection track notches 117' and 117" towards the second projection track notch 117", or towards the second projection track notch 117'), causing the inner body 103 to translate axially (along axis Z) and rotate (about axis Z) relative to the outer body 101.

On moving between the different positions, the first and second seals 1, 1' allow for ease of movement due to reduced frictional resistance between the moving parts of the plumbing fitting 100. This is because on moving between the different positions, the outer body 101 moves along the length of the seals 1, 1', rather than across the length of seals 1, 1'.

In the first, operational, position, the drain port 140 aligns with the bypass bore 136 and can be used to drain any water held in the bypass bore 136. In the second, isolation, position and the third, bypass position, the bypass bore 136 is rotationally (about axis Z) and translationally (along axis Z) displaced from the drain port 140. A person skilled in the art will appreciate that the drain port 140 can take various forms, e.g. a tap or plug.

The plumbing fitting 100 can be releasably secured in the operational position, the isolation position, or the bypass position, by screwing the first and second projections 109 into a notch 116', 116" provided in the first projection track 116 and a notch 117', 117" provided in the second projection track 117 (as applicable).

In use, in the operational position, fluid can flow via the flow path 102, into the inlet bore in the inlet connector 105, then through the inner body inlet 111 and the mechanism 104, then through the inner body outlet 112, then through the outlet bore in the outlet connector 106. Hence, fluid cannot enter the bypass inlet 118 or the bypass outlet 119, which are rotationally (about the Z axis) and translationally (along the Z axis) displaced from the inlet and outlet bores, and are sealed off by the respective third apertured sealing portions 4 of the first and second seals 1. In this way, the mechanism 104 can perform its predetermined function (e.g. in the case of a pressure independent control valve (PICV) mechanism, to control and regulate flow, and to control the pressure differential across the PICV).

In use, in the isolation position, fluid cannot flow via the flow path 102, into the inner body 103 or mechanism 104, since the flow path is blocked by the outer sealing surfaces 130, 131 of the inner body 103, which sealing surfaces 130, 131 are sealed off by the respective second apertured sealing portions 3 of the first and second seals 1. Hence, fluid cannot enter the inner body inlet 111 or the inner body outlet 112, which are rotationally (about the Z axis) and translationally (along the Z axis) displaced from the inlet and outlet bores, and are sealed off by the respective second apertured sealing portions 3 of the first and second seals 1. In this way, in the isolation position, the mechanism 104 can be accessed for maintenance or repair, as desired or required, and fluid is permitted to flow through the flow path 102, without the need for any separate valves to effect the isolation.

In use, in the bypass position, fluid can flow via the flow path 102 through the inlet bore in the inlet connector 105, then through the bypass bore 136, then through the outlet bore in the outlet connector 106. Hence, fluid cannot enter the inner body inlet 111 or the inner body outlet 112, which are rotationally (about the Z axis) and translationally (along the Z axis) displaced from the inlet and outlet bores, and are sealed off by the respective third apertured sealing portions 4 of the first and second seals 1. In this way, in the bypass position, the mechanism 104 can be accessed for maintenance or repair, as desired or required, whilst fluid flows through the flow path 102, without isolating/disconnecting the plumbing fitting 100 from the system to which it is connected.

The plumbing fitting 100 further comprises a twist lock mechanism 132 comprising a first lock portion provided on the outer body 101; and a corresponding second lock portion provided on the inner body 104. The first lock portion can be screwed into the first lock portion via a screw and thread arrangement. Thus, the inner body 104 may be fixed in position relative to the outer body 101 by fastening the first lock portion to the second lock portion. Other twist lock mechanisms may be used, as will be appreciated by a person skilled in the art.

Figure 10:
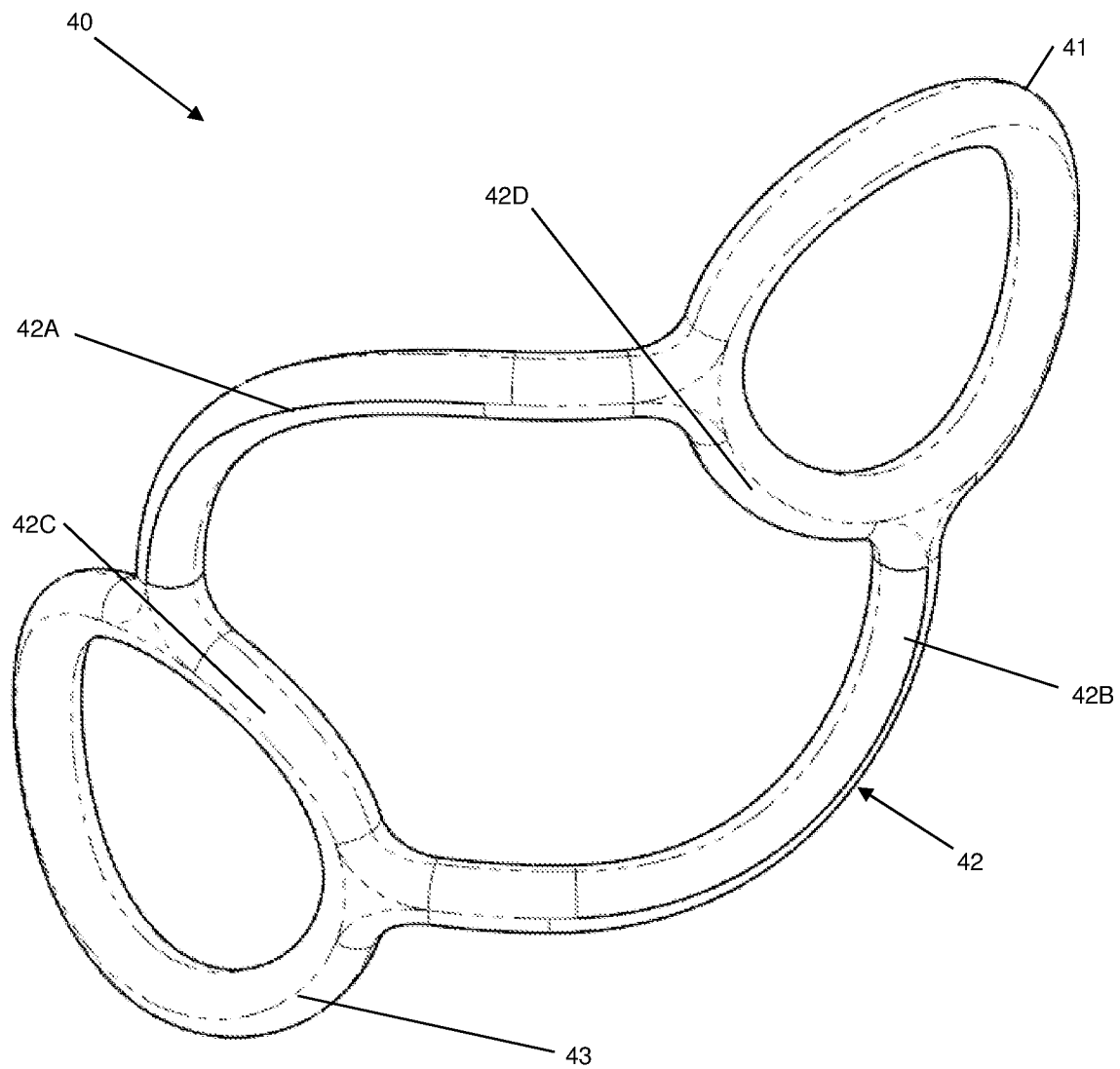
FIG. 10 shows a seal according to a second embodiment of the invention.

With reference to FIG. 10, a tandem O-ring seal 40 according to a second embodiment is described below. The seal 40 functions in exactly the same way as the seal 1 of the first embodiment and is for use with a plumbing fitting which is substantially the same as the plumbing fitting of the first embodiment, except that the first and second seal tracks 120, 121 of the inner body of the plumbing fitting of the second embodiment are adapted in shape and dimensions to correspond with the shape and dimensions of the tandem O-ring seal 40 of the second embodiment.

The tandem O-ring seal 40 comprises a first apertured sealing portion 41; a second apertured sealing portion 42; and a third apertured sealing portion 43, the second apertured sealing portion 42 being arranged between the first apertured sealing portion 41 and the third apertured sealing portion 43.

The first apertured sealing portion 41 is substantially ring-shaped and comprises one edge portion 41A enclosing an aperture 41X.

The third apertured sealing portion 43 is substantially ring-shaped and comprises one edge portion 43A enclosing an aperture 43X.

The first apertured sealing portion 41 and the third apertured sealing portion 42 are of substantially the same form.

The second apertured sealing portion 42 is of a substantially rectangular shape, with two, spaced apart, long edge portions 42A, 42B and two, spaced apart, short edge portions 42C, 42D, which edge portions enclose an aperture 42X. Each of the long edge portions 42A, 42B is substantially curved and each of the short edge portions 42C, 42D is substantially curved. The long edge portions 42A, 42B are laterally joined together by the short edge portions 42C, 42D. Each of the short edge portions 42C, 42D is convex when viewed from between those short edge portions. Each of the long edge portions 42A, 42B is concave when viewed from between those long edge portions.

One of the short edge portions 42C of the second apertured sealing portion 42 forms part of the edge portion of the 41A of the first apertured sealing portion 41. The other of the short edge portions 42D of the second apertured sealing portion 42 forms part of the edge portion of the 43A of the third apertured sealing portion 43.

Each edge portion 41A, 42A-D, 43A of the first apertured sealing portion 41, the second apertured sealing portion 42 and the third apertured sealing portion 43 has a cross sectional shape which is substantially circular.

The first, second and third apertured sealing portions 43 41, 42, 43 are integrally formed in the sense that they are made of the same piece of injection moulded EDPM rubber.

Figure 11:
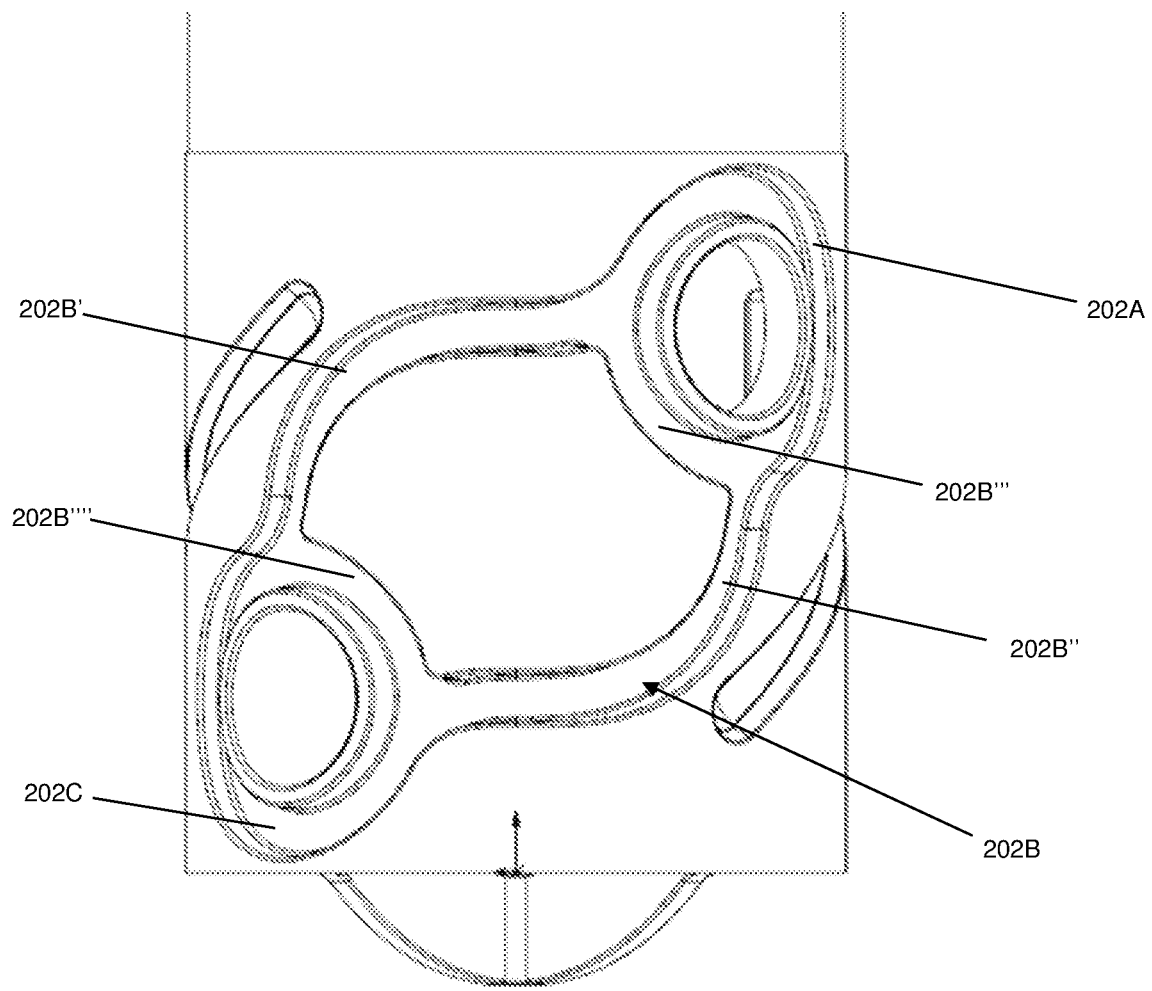
FIG. 11 shows a partial view of an inner body of a plumbing fitting according to the second embodiment of the invention.

With reference to FIG. 11, inner body of the plumbing fitting for use with the seal 40 has a first seal track 202 and a second seal track. In FIG. 11, only the first seal track 202 is shown, but the (substantially identical) form of the second seal track will be apparent to a person skilled in the art. The first and second seal tracks are substantially identical in form and are recessed into diametrically opposing circumferential surfaces of the inner body 103. Each of the first and second seal tracks traces an arc of the circumferential surface of the inner body 103, the arc having a central angle of approximately 90 degrees. The first and second seal tracks are superimposable on each other by rotation about the longitudinal axis of the inner body 103.

The first seal track 202 comprises a first apertured sealing portion track 202A; a second apertured sealing portion track 202B; and a third apertured sealing portion track 202C, the apertured sealing portion tracks 202A-C being integrally formed with, and continuously transitioning into, each other.

The first and third apertured sealing portion tracks 202A, 202C of the first seal track 202 are of substantially the same, substantially annular (i.e. ring) shape.

The second apertured sealing portion track 202B of the first seal track 202 is of a substantially rectangular shape, with two, spaced apart, long edge tracks 202B', 202B''; and two, spaced apart, short edge tracks 202B''', 202B''''. Each of the long edge tracks 202B', 202B'' of the first seal track 202 is substantially curved and each of the short edge tracks 202B''', 202B'''' of the first seal track 202 is substantially curved. Each of the long edge tracks 202B''', 202B'''' of the first seal track has a section which intersects a split line (discussed below) formed on the inner body at an intersection point, wherein at each intersection point each section is substantially perpendicular to the split line. This configuration advantageously allows the first seal track 202 to be formed, e.g. injection moulded, without unwanted undercuts. Each of the long edge tracks 202B', 202B'' of the first seal track 202 is concave when viewed from between those short edge tracks 202B', 202B''. Each of the short edge tracks 202B''', 202B'''' of the first seal track 202 is convex when viewed from between those short edge tracks 202B''', 202B''''. The shape and dimensions of the first seal track 202 correspond with the shape and dimensions of the tandem O-ring seal 40 of FIG. 10, as, in use, the first seal track 202 receives a seal 40.

The first and third apertured sealing portion tracks of the second seal track are of substantially the same, substantially annular (i.e. ring) shape.

The second apertured sealing portion track of the second seal track is of a substantially rectangular shape, with two, spaced apart, long edge tracks; and two, spaced apart, short edge tracks. Each of the long edge tracks of the second seal track is substantially curved and each of the short edge tracks of the second seal track is substantially curved. Each of the long edge tracks of the second seal track has a section which intersects a split line (discussed below) formed on the inner body at an intersection point, wherein at each intersection point each section is substantially perpendicular to the split line. This configuration advantageously allows the second seal track to be formed, e.g. injection moulded, without unwanted undercuts. Each of the long edge tracks of the second seal track is concave when viewed from between those long edge tracks. Each of the short edge tracks of the second seal track is convex when viewed from between those short edge tracks. The shape and dimensions of the second seal track correspond with the shape and dimensions of the tandem O-ring seal 40 of FIG. 9, as, in use, the second seal track receives a seal 40.

As a person skilled in the art will appreciate, when the plumbing fitting is manufactured (e.g. by injection moulding), the inner body may be formed with a plurality of split lines which are imparted by the manufacturing tool. One or more of the split lines may intersect a section of the edge tracks (e.g. the long edge tracks) of the first seal track and/or of the second seal track. Where the intersection or intersections do not occur at a right angle, unwanted undercuts may form on the long edge tracks of the first seal track and/or of the second seal track. An advantage of the second embodiment is that the unwanted undercuts on the first and second seal tracks are avoided. In this way, the split lines are easier to include.

The one or more embodiments are described above by way of example only. Many variations are possible without departing from the scope of protection afforded by the appended claims.

The invention claimed is:

1. A plumbing fitting comprising:
   an outer body having a flow path extending therethrough;
   an inner body disposed in the outer body, the inner body begin arranged to receive, a mechanism;
   wherein the inner body is movable between a first, operational, position in which the flow path extends through the inner body and the mechanism, a second, isolation, position in which the flow path is blocked by an outer sealing surface of the inner body, and a third position in which the flow path bypasses the mechanism via the inner body.

2. The plumbing fitting as claimed in claim 1 wherein the outer body comprises an inlet connector having an inlet bore, and an outlet connector having an outlet bore, wherein the flow path extends between the inlet bore and the outlet bore.

3. The plumbing fitting as claimed in claim 1 wherein the inner body is movable between the first, operational, position, the second, isolation, position and the third position by rotation of the inner body relative to the outer body.

4. The plumbing fitting as claimed in claim 1 wherein the inner body is disposed in, and axially movable along an axis relative to, the outer body.

5. The plumbing fitting as claimed in claim 1 wherein the inner body comprises a bypass inlet; a bypass outlet; a bypass bore, the bypass bore extending between the bypass inlet and the bypass outlet; an inner body inlet; and an inner body outlet.

6. The plumbing fitting as claimed in claim 5 wherein the bypass bore is displaced from the inlet bore and the outlet bore in the first, operational, position and the second, isolation, position; and is in alignment with the inlet bore and the outlet bore in the third position.

7. The plumbing fitting as claimed in claim 1 wherein the plumbing fitting comprises one or more sealing members.

8. The plumbing fitting as claimed in claim 1 wherein the plumbing fitting comprises one or more sealing members; wherein a first seal is a seal comprising a first apertured sealing portion, a second apertured sealing portion and a third apertured sealing portion, each apertured sealing portion independently comprising one or more edge portions enclosing an aperture, wherein the second apertured sealing portion is arranged between the first apertured sealing portion and the third apertured sealing portion, which apertured sealing portions are integrally formed, wherein in the first, operational position, the first apertured sealing portion of the first seal is arranged to prevent fluid egress from the inlet bore and inner body inlet, between the outer body and the inner body; and/or in the second, isolation, position, the second apertured sealing portion of the first seal is arranged to prevent fluid egress from the inlet bore and a first outer sealing surface of the inner body, between the outer body and the inner body; and/or in the third position, the third apertured sealing portion of the first seal is arranged to prevent fluid egress from the inlet bore and the bypass inlet, between the outer body and the inner body.

9. The plumbing fitting as claimed in claim 8 wherein the edge portion or portions of the first apertured sealing portion of the first seal are arranged around the inner body inlet; and/or the edge portion or portions of the second apertured sealing portion of the first seal delimit the first outer sealing surface of the inner body; and/or the edge portion or portions of the third apertured sealing portion of the first seal are arranged around the bypass inlet.

10. The plumbing fitting as claimed in claim 8 wherein the plumbing fitting comprises a second seal which is a seal comprising a first apertured sealing portion, a second apertured sealing portion and a third apertured sealing portion, each apertured sealing portion independently comprising one or more edge portions enclosing an aperture.

11. The plumbing fitting as claimed in claim 10 wherein the edge portion or portions of the first apertured sealing portion of the second seal are arranged around the inner body outlet.

12. The plumbing fitting according to claim 10 wherein in the first, operational position, the first apertured sealing portion of the second seal is arranged to prevent fluid egress from the outlet bore and inner body outlet, between the outer body and the inner body.

13. The plumbing fitting according to claim 10 wherein in the second, isolation, position, the second apertured sealing portion of the second seal is arranged to prevent fluid egress from the outlet bore and a second outer sealing surface of the inner body, between the outer body and the inner body.

14. The plumbing fitting according to claim 10 wherein in the third position, the third apertured sealing portion of the second seal is arranged to prevent fluid egress from the outlet bore and the bypass outlet, between the outer body and the inner body.

15. The plumbing fitting according to claim 10 wherein the edge portion or portions of the second apertured sealing portion of the second seal delimit the second outer sealing surface of the inner body.

16. The plumbing fitting according to claim 10 wherein the edge portion or portions of the third apertured sealing portion of the second seal are arranged around the bypass outlet.

* * * * *